United States Patent [19]
Horsley

[11] Patent Number: 5,081,594
[45] Date of Patent: Jan. 14, 1992

[54] REAL-TIME RASTERIZATION SYSTEM FOR A COLUMN-ORIENTED PRINTING APPARATUS OR THE LIKE

[75] Inventor: Brian Horsley, Monmouth Junction, N.J.

[73] Assignee: Kroy Inc., Scottsdale, Ariz.

[21] Appl. No.: 304,514

[22] Filed: Jan. 31, 1989

[51] Int. Cl.[5] .............................................. G06K 9/44
[52] U.S. Cl. ................................. 395/150; 340/750; 395/148
[58] Field of Search .................. 364/518, 519; 400/63, 400/83, 706; 340/730, 731, 750, 747; 382/55, 56

[56] References Cited

U.S. PATENT DOCUMENTS

| | | | |
|---|---|---|---|
| 4,674,059 | 6/1987 | Shrieber | 364/523 |
| 4,675,830 | 6/1987 | Hawkins | 364/518 |
| 4,745,560 | 5/1988 | Decker et al. | 364/519 |
| 4,770,552 | 9/1988 | Nishijima et al. | 400/121 |
| 4,785,391 | 11/1988 | Apley et al. | 364/518 |
| 4,799,172 | 1/1989 | Wood et al. | 364/518 |
| 4,817,172 | 3/1989 | Cho | 382/21 |
| 4,837,712 | 6/1989 | Shibamiya | 364/523 |
| 4,847,607 | 7/1989 | Schoon | 340/730 |
| 4,847,787 | 7/1989 | Nishigama et al. | 364/518 |
| 4,855,933 | 8/1989 | Kando | 364/518 |

Primary Examiner—Gary V. Harkcom
Assistant Examiner—Phu K. Nguyen
Attorney, Agent, or Firm—Dorsey & Whitney

[57] ABSTRACT

A rasterization system is provided to control the formatting and manipulations of font and character information to perform real-time rasterization of images of selected characters to be output to a column-oriented printing or display apparatus. The rasterization system is comprised of a programmable data processor for receiving input data and font data and for generating print data and control signals for outputting the selected characters. The programmable data processor performs the real-time rasterization of the input data (representing the desired characters to be printed) and the font data (representing the outlines of the particular size and font of the selected character set) by creating an intermediate edge list data base before completing the fill or rasterization process required to generate the pixel output data used to print the selected characters on the tape. The creation of an intermediate edge list data base allows the data processor to perform the rasterization of the characters in real-time at a rate sufficiently fast enough to keep up with the worst-case data transfer rate required by the printing or display apparatus.

56 Claims, 14 Drawing Sheets

SEQUENTIAL PROCESS

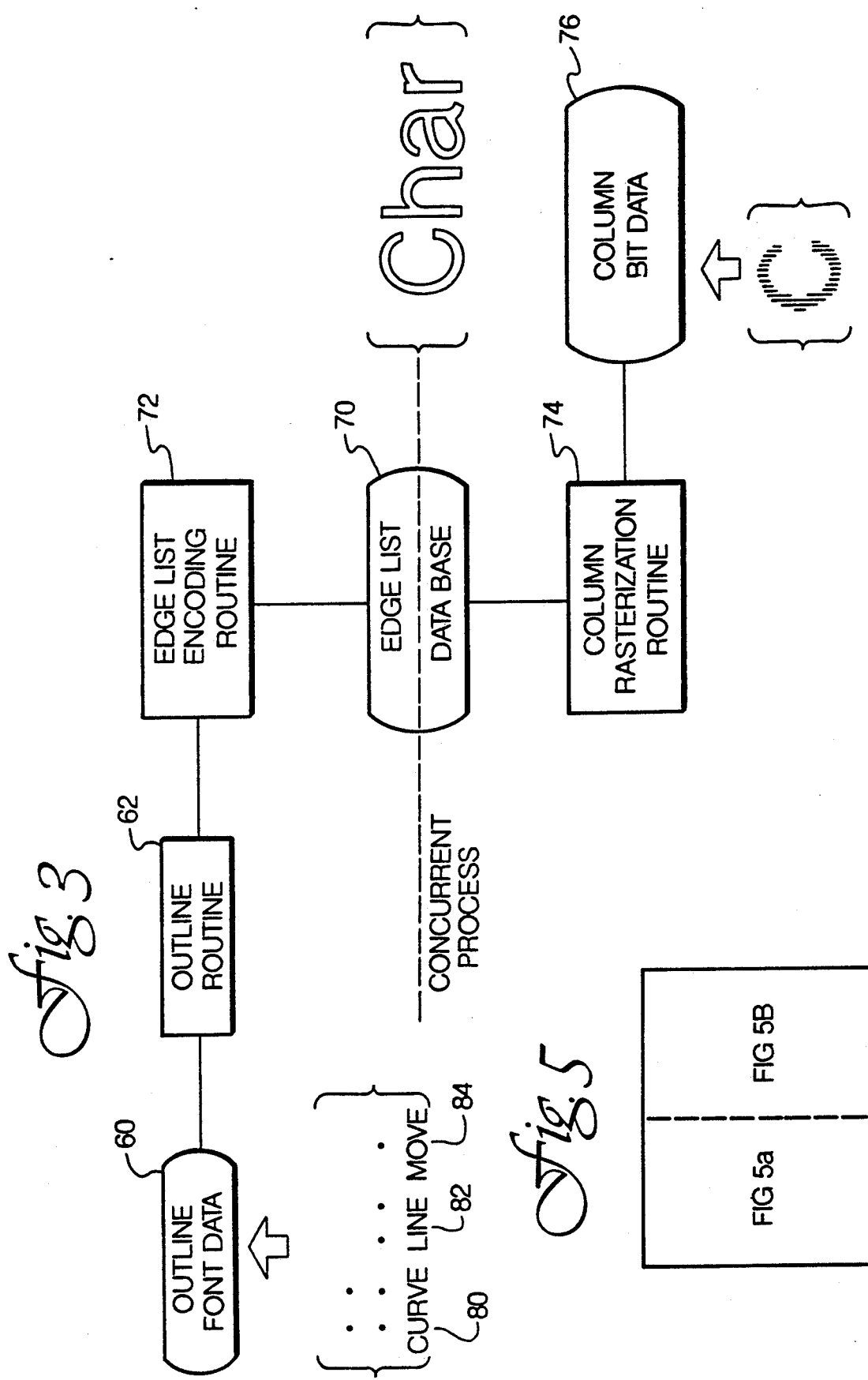

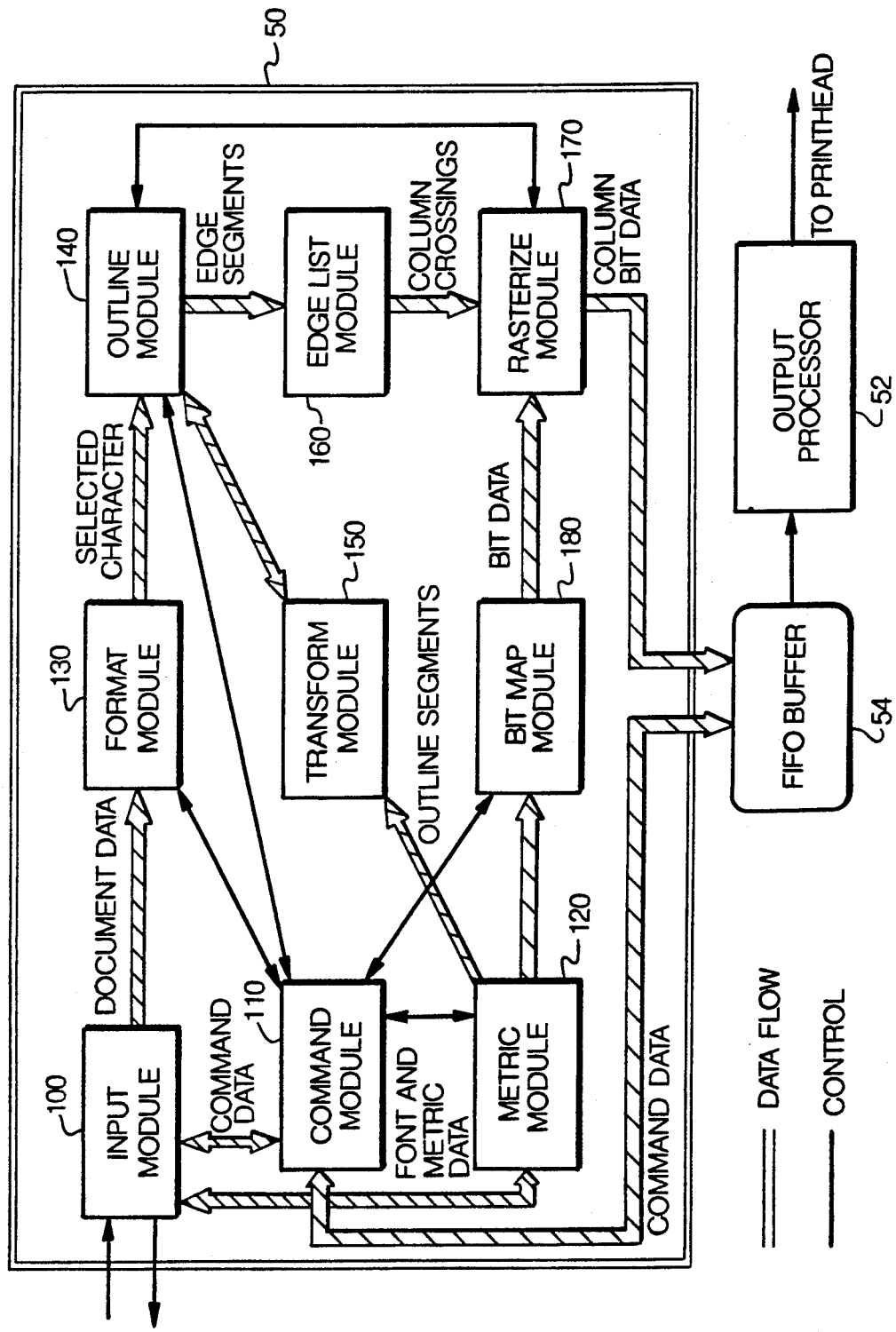

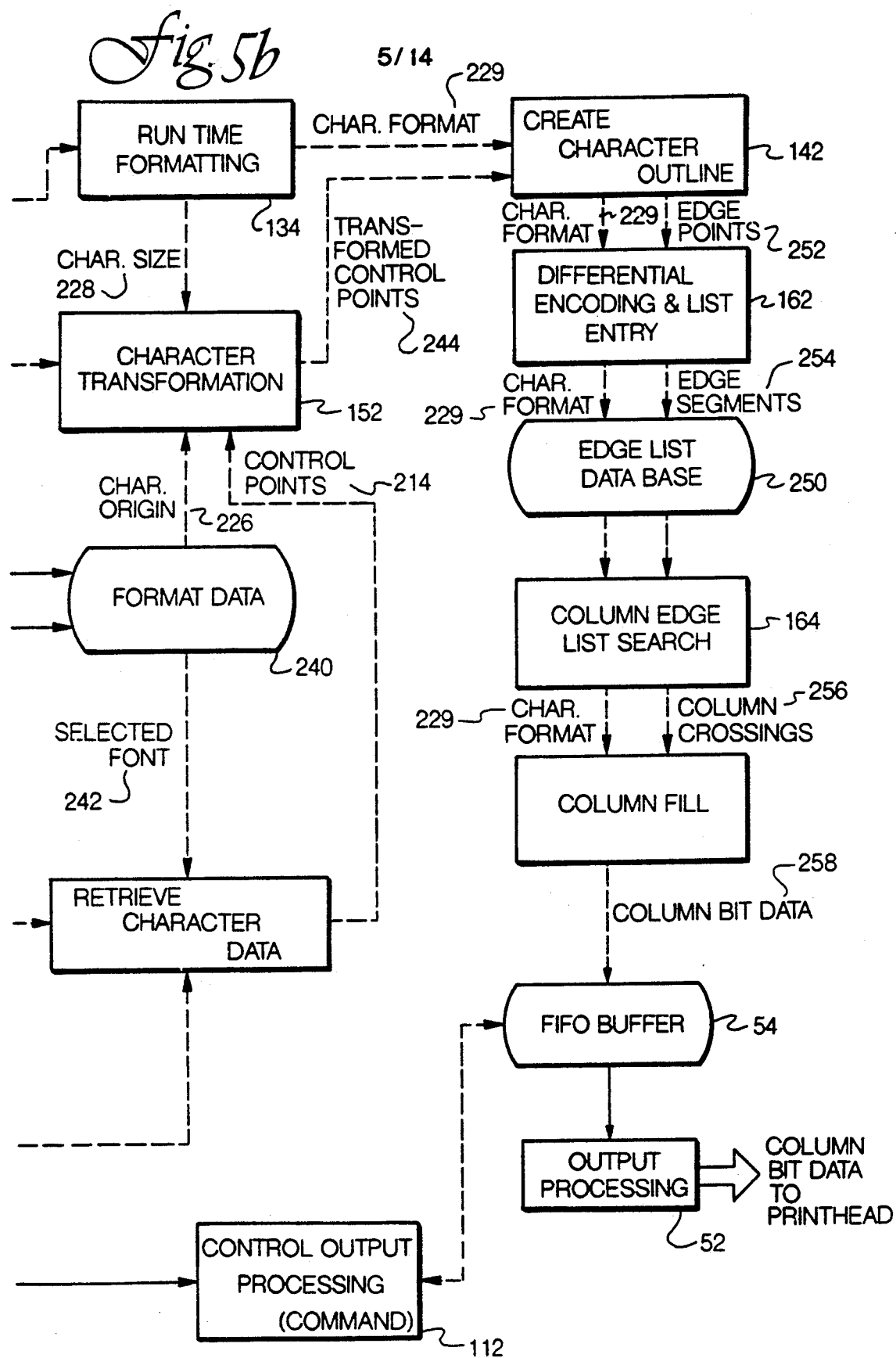

Fig. 10

| LIST 1 | LIST 2 | LIST 3 | LIST 4 | LIST 5 | LIST 6 | LIST 7 | LIST 8 | LIST 9 | LIST 10 |
|---|---|---|---|---|---|---|---|---|---|
| (25,150) | (138,15) | (245,117) | (210,117) | (138,50) | (60,150) | (138,255) | (210,203) | (245,203) | (138,290) |
| + | + | – | – | – | + | + | + | – | – |
| WINDING | WINDING | WINDING | WINDING | WINDING | WINDING | WINDING | WINDING | WINDING | WINDING |
| P DATA | P DATA | P DATA | P DATA | P DATA | P DATA | P DATA | P DATA | P DATA | P DATA |
| P NEXT LIST | P NEXT LIST | P NEXT LIST | P NEXT LIST | P NEXT LIST | P NEXT LIST | P NEXT LIST | P NEXT LIST | P NEXT LIST | P NEXT LIST |
| +14 | +8 | –35 | +9 | +13 | +9 | +3 | +35 | +7 | +10 |
| –127 | +127 |   | –127 | +128 | +128 | –127 |   | +127 | –127 |
| +8 | +8 |   | +7 | +5 | +7 | +5 |   | +3 | +3 |
| ... | ... |   | ... | ... | ... | ... |   | ... | ... |
| +3 | +5 |   | +5 | +7 | +5 | +7 |   | +8 | +8 |
| –127 | +127 |   | +128 | +128 | +128 | –127 |   | +127 | –127 |
| +10 | +7 |   | +9 | +9 | +13 | +9 |   | +14 | +12 |

REAL-TIME RASTERIZATION SYSTEM FOR A COLUMN-ORIENTED PRINTING APPARATUS OR THE LIKE

TECHNICAL FIELD

The present invention relates generally to the field of printing apparatus or composing systems. More particularly, the present invention relates to an improved method of representing and manipulating fonts for characters, pictorial images or the like (hereinafter collectively referred to as "characters") to be printed by a column-oriented pixel-type printing or display apparatus, especially a printing apparatus of the type involving the use of a thermal process to transfer characters from a color carrying ribbon onto an image carrying tape as a result of the localized application of heat and pressure. This type of printing apparatus or composing system has particular application in the printing of relatively large characters or sequences of characters of varying type sizes and fonts for use in preparing lettering for engineering drawings, flip charts, overhead transparencies, posters, advertising brochures, identification labels and the like. The characters printed by this type of printing apparatus are generally larger than characters produced by most typewriters or the like and include a wide variety of type sizes and fonts for alphanumeric characters, along with any number of special characters or images such as symbols, logos and trademarks.

BACKGROUND ART

Tape lettering systems employing a dry lettering printing process that mechanically transfers an impression of a character on a rotatable type disc from a dry film ribbon to an image carrying tape by means of a high pressure printing force are well known in the prior art, and are shown and described in U.S. Pat. Nos. 3,834,507; 4,243,333; and 4,402,619. An automated tape lettering machine employing this process is shown and described in U.S. Pat. No. 4,462,708. While each of these prior art machines is capable of generating high quality printing and lettering results, there is a need for a high speed tape printing apparatus capable of generating and modifying the appearance of the characters without the limitations imposed by the using a rotatable type disc.

In an apparatus or system for dry lettering of the type described above, the operator is required to physically change the type disc each time a new size or font is desired that is not available on the current type disc. As the number of sizes and fonts available on a type disc is directly limited by the physical size of the type disc, printing a sequence of characters of varying sizes and fonts is prohibitively time consuming and expensive, requiring a large number of type discs to provide the varying sizes and fonts of characters that may be desired. In addition, because an operator is generally required to change type discs for a change in size or font, the performance advantages of the automated tape lettering machine described in U.S. Pat. No. 4,462,708 can not be achieved when the sequence of characters to be printed includes type sizes or fonts that are not all available on a single type disc.

Column-oriented thermal transfer printing devices also exist in which an image of a desired character is formed on a strip of image carrying tape by transferring ink or other color from a color carrying ribbon to the tape as a result of the localized application of heat and small amount of pressure. A typical thermal transfer device of this type is described in U.S. Pat. No. 4,666,319. Another thermal transfer device presently available employs a thermal print head for transferring images from a strip of ribbon to a strip of tape and has a cooperating tape-ribbon cartridge for providing a supply of tape and ribbon to the device. While such devices are useful for printing smaller point size characters, the fonts for such characters are represented using a dot matrix array format that limits the number of sizes and fonts of print that are available. The limitations of this method of representation make it impractical to perform in real-time any type of manipulations to vary the size, arrangement, sequence, orientation or attributes of the characters to be printed.

In a dot-matrix thermal printer of the type described above, fonts are stored in a dot-matrix array format with each pixel to be printed represented in the font data, for instance a $5 \times 7$ dot matrix array. This type of representation of the font is not practical when the dimension of the array begin to approach the pixel resolution necessary for high quality lettering in point sizes larger than 14 points. For example, the number of pixels that must be stored for each character or image in a $5 \times 7$ dot-matrix array would be a maximum of 35 pixels. If, however, the dot-matrix array needed to represent characters or images having $300 \times 400$ dot-matrix array, each character would require a maximum of 120,000 pixels to be stored. With more than 150 characters and other images present in a typical font character set, requiring 120,000 pixels or bits of information to be stored for each character would mean that 10,000,000 bits or 1.25 million bytes of information would be necessary to represent an entire character set for a font of a single type and size.

In other pixel-based printer or display applications, for example laser printers, video displays and photo typesetters, font information is sometimes stored in an outline format, rather than in a dot-matrix array format. By storing only the outline of a character in the font data, the system has all of the information necessary to print or display that character by a process known as "rasterization", generating the outline of the character and filling in the area inside the outline. Outline information for a particular character or image may be stored as a set of all points representing the outline of the character, U.S. Pat. No. 3,305,841, a set of vectors representing the outline of the character, U.S. Pat. No. 4,298,945, or a set of arcs or curves representing the outline of the character, U.S. Pat. Nos. 4,542,412, and 4,675,833. In all of the rasterization systems described above, rasterization occurs in a non real-time environment because the printer or display is generating a direct bit map of the entire page or line to be printed or displayed, rather than printing or displaying a single column of pixels as they are generated. While such systems are useful for printing or displaying entire lines or pages of characters, they necessarily require a large processing capability and sufficient amounts of memory to store an entire bit map for the line or page of output as it is being generated prior to display, capabilities that are not necessary in the type of printing or display apparatus that outputs characters as they are generated.

Although the above devices may be satisfactory for various uses and applications, they do not provide for the ability to represent a wide variety of type sizes and fonts and also allow for the real-time manipulation of the size, arrangement, sequence, orientation, or attributes of characters or images in the type of printing or display apparatus that outputs characters as they are generated. Accordingly, there is a continuing need for improvements in the real-time rasterization systems associated with column-oriented printing and display apparatus and, in particular, in the real-time rasterization systems associated with thermal transfer tape lettering systems capable of performing real-time rasterization and manipulation of the fonts for characters to be printed on a strip of tape.

SUMMARY OF THE INVENTION

In accordance with the present invention a rasterization system is provided to control the formatting and manipulations of font and character information to perform real-time rasterization of images of selected characters to be output to a column-oriented printing or display apparatus. In a preferred embodiment of the invention, the rasterization system is comprised of a programmable data processing means for receiving input data and font data and for generating print data and control signals for outputting the selected characters. The programmable data processing means performs the real-time rasterization of the input data (representing the desired characters to be printed) and the font data (representing the outlines of the particular size and font of the selected character set) by creating an intermediate edge list data base before completing the fill or rasterization process required to generate the pixel output data used to print the selected characters on the tape. The creation of an intermediate edge list data base allows the data processing means to perform the rasterization of the characters in real-time at a rate sufficiently fast enough to keep up with the worst-case data transfer rate required by the printing or display apparatus.

The real-time rasterization system is well-suited for controlling the formatting and outputting of information to a thermal transfer tape lettering device in which the image of a desired character is transferred from a strip of color carrying ribbon to a strip of image carrying tape. Generally, such a thermal transfer tape-lettering device includes an image transfer station defined by a printhead and a cylindrical platen and rotary drive means for advancing the tape and ribbon from a supply cartridge past the image transfer station. It may also include a font cartridge, a tape-ribbon cartridge, and an input module for entering, editing, storing and transmitting the selected characters or designs to be printed on the tape.

Accordingly, a primary objective of the present invention is to provide a real-time rasterization system for an image transfer station that will allow for the real-time rasterization of print data used to print the images of selected characters by creating an intermediate edge list data base based upon input data representing the selected character and font data representing the outlines of the selected character set.

Another objective of the present invention is to provide for an improved control system for a thermal transfer tape lettering device for transferring characters of a wide variety of type sizes and fonts from a strip of ribbon to a strip of image carrying tape without the limitations imposed by using a rotatable type disc.

A further objective of the present invention if to provide a rasterization system for an image transfer station that can be implemented without requiring extensive memory for storing the print data used to print the selected characters.

These and other objectives of the present invention will become apparent with reference to the drawings, the detailed description of the preferred embodiment and the appended claims.

DESCRIPTION OF THE DRAWINGS

FIG. 3 is a block diagram showing the concurrent rasterization process of the present invention.

FIG. 4 is a block diagram showing the data flow for the processing means of the present invention.

FIG. 10 is a detailed block diagram showing the actual edge data in the Edge List Data Base for the sample character shown in FIG. 9.

DESCRIPTION OF THE PREFERRED EMBODIMENT

Figure 1:
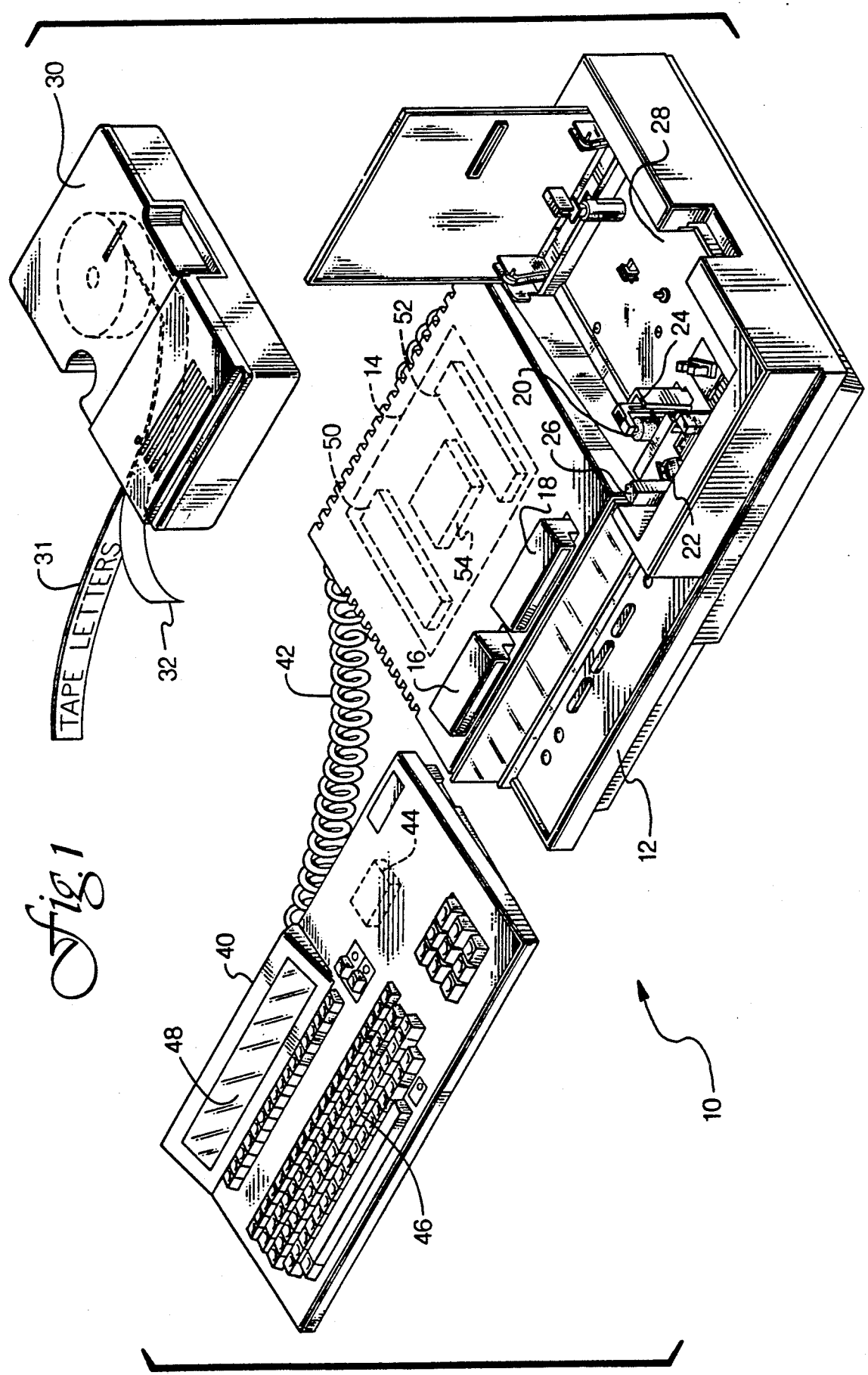
FIG. 1 is an exploded pictorial view of a tape lettering printing apparatus for use with the present invention showing a thermal transfer device, font cartridges, tape-ribbon cartridge, and input module with umbilical cord attachment to the thermal transfer device.

The real-time rasterization system of the present invention is applicable to a variety of column-oriented, pixel-type printing or display apparatus that output characters as they are generated. While the preferred embodiment of the present invention will be described with respect to its application to a thermal transfer tape lettering device, it should be recognized that the invention will work equally as well with other types of lettering or display apparatus, including thermal printers without a transfer tape, as well as variety of strip printers. As illustrated in FIG. 1, the operative components of the thermal transfer tape lettering or printing apparatus 10 for use with the preferred embodiment of the present invention generally includes a thermal transfer device 12, a processing means 14, font cartridges 16 and 18, an image transfer station 20 defined by and disposed between a printhead assembly 22 and a cooperating platen assembly 24, and a drive roller assembly 26. Associated with transfer device 12 is a movable cartridge service or receiving tray 28 for receiving a tape-ribbon cartridge 30. Cartridge 30 includes a supply of tape and ribbon for providing a tape 31 and a ribbon 32 to the image transfer station 20. The printing apparatus 10 may further comprise an input means 40 for entering, editing, storing, manipulating, and/or transmitting input data to the processing means 14 via an umbilical cord interface 42. In one embodiment, the input means 40 comprises a programmable digital microprocessor 44, a keyboard 46 and a display 48. The input means 40 may also be a digital computer or other device capable of interfacing with the processing means 14 through the interface 42, shown as an RS-232-C communication port.

Although the real-time rasterization system has applicability to various column-oriented lettering and display apparatus, it has particular applicability to a thermal transfer device and associated tape-ribbon cartridge of the type shown and disclosed in co-pending applications entitled TAPE-RIBBON SUPPLY SYSTEM FOR A THERMAL TRANSFER DEVICE OR THE LIKE, Ser. No. 151,103, THERMAL TRANSFER DEVICE AND TAPE-RIBBON CARTRIDGE THEREFOR, Ser. No. 151,110, THERMAL TRANSFER DEVICE AND TAPE-RIBBON CARTRIDGE EMBODYING A TAPE CUT-OFF MECHANISM, Ser. No. 151,109, AN AUTOMATED THERMAL TRANSFER DEVICE AND CONTROL SYSTEM THEREFOR, Ser. No. 170,796, and PIXEL PREHEAT SYSTEM FOR AN AUTOMATED THERMAL TRANSFER DEVICE, Ser. No. 170,756, all of which are hereby fully incorporated by reference herein.

In general, the rasterization system of the present invention includes a processing means 14 for receiving print data and control codes representing the desired characters to be printed and for controlling the printing of that information by transfer station 20. For the printing apparatus 10 shown in FIG. 1, the preferred processing means 14 comprises a pair of programmable digital microprocessors - rasterization processor 50 and output processor 52. The combination of features that make up the processing means 14 is preferably controlled by a stored software program that functions in the manner described in connection with FIGS. 4 and 5, although those skilled in the art will recognize that software functions can be accomplished by equivalent hardware. While a pair of microprocessors 50 and 52 are described as a preferred embodiment of processing means 14, it should also be recognized that the invention could also be achieved through the use of a single microcomputer and associated circuitry, or multiple microcomputers and associated circuitry, or any combination thereof. In the preferred embodiment of the invention, the rasterization processor 50 is an 80186 microprocessor, available from Intel Corporation of Santa Clara, Calif., and the output processor 52 is an 8051 microprocessor, also available from Intel Corporation.

The real-time rasterization system of the present invention is primarily accomplished by the rasterization processor 50. The output processor 52 is used to modulate and control the actual printing by the printhead assembly 20 of each column of pixel data produced by the rasterization processor 50. This is accomplished by the use of a FIFO buffer 54, as shown in FIG. 4, situated between the rasterization processor 50 and the output processor 52. The rasterization processor 50 fills the FIFO buffer 54 with successive columns of pixel data until the buffer is full or until there are no more characters to be printed. As the printhead assembly is ready to accept a new column of pixel data to be printed, the output processor 52 interrupts the rasterization processor 50 and requests that the next column of pixel data be transferred to the output processor 52. If the level of the FIFO buffer 54 drops below a preset value after the next column of pixel data has been transferred to the output processor 52, the rasterization processor 50 fills the FIFO buffer 54 again. This process is repeated until there is no more data to be printed. The division of responsibilities between the processors enables the rasterization processor 50 to devote more time to preparing the pixel data to be printed, rather than monitoring the actual printing of the pixel data itself.

Figure 2:
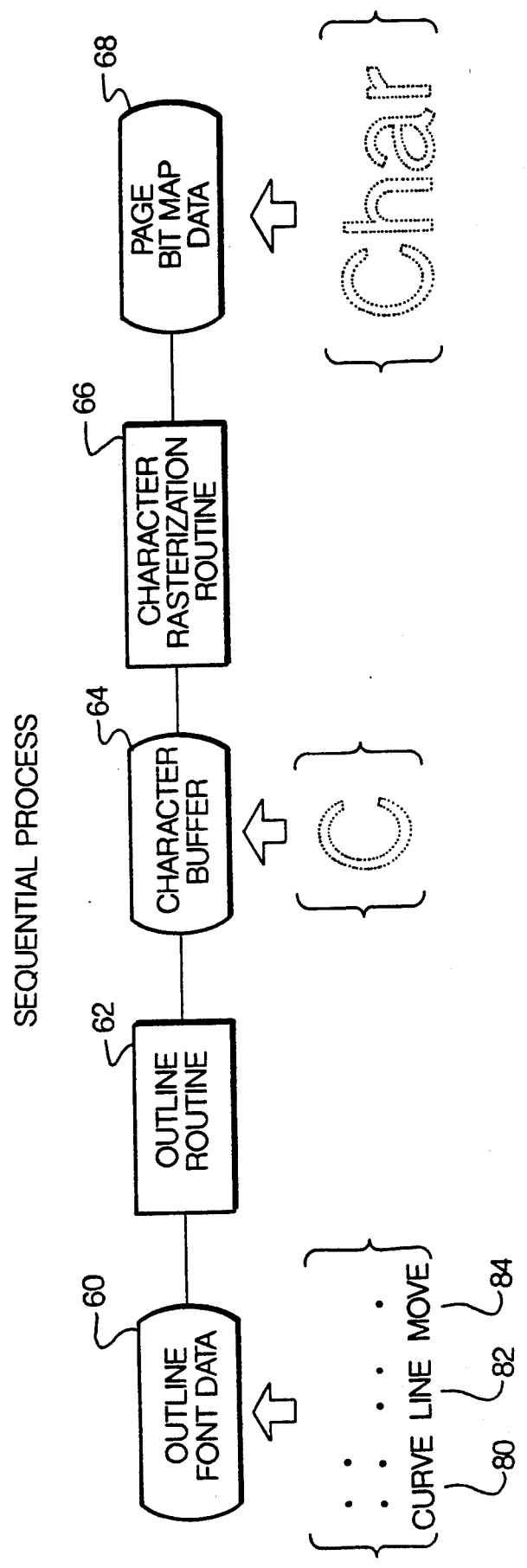
FIG. 2 is a block diagram showing the sequential rasterization process used in the prior art.

Referring now to FIG. 2, a block diagram of a typical rasterization system available in the prior art is shown. The rasterization performed by such a system is a generally a sequential process where the outline font data is rasterized on a character-by-character basis and then stored in a page-oriented bit map prior to printing or display. The Outline Font Data 60 is stored as scaled values representing Curves 80, Lines 82 and Moves 84 that form the outline of a desired character. An Outline Routine 62 generates a bit-oriented outline of the desired character that is stored in a Character Buffer 64. A Character Rasterization Routine 66 fills in the bit-oriented outline one character at a time to generate the pixel data that is stored in Page Bit Map 68 until such time as an entire line or page of information is to be displayed or printed. Most prior art rasterization systems are used to generate an entire line, screen, or page worth of character information to be printed or displayed all at one time. Because the memory requirements inherent in the storage of an entire line or page worth of information are significant, it is prohibitively expensive to use such a system for the generation of characters to be printed by a system that prints or displays character information a few characters at a time.

As seen in FIG. 3, the disadvantages of the prior art rasterization systems are overcome in the present invention by the creation of an intermediate Edge List Data Base 70 using an Edge List Encoding Routine 72 that generates a differential encoding of the edges of each character on a column-by-column basis. Based upon the information stored in Edge List Data Base 70, a Column Rasterization Routine 74 generates a series of columnar set of pixel data, represented as Column Bit Map 76, that are stored in the FIFO buffer 54 to be sent to the output processor 52. By using the condensed and efficiently organized information contained in the Edge List Data Base 70, the Column Rasterization Routine 74 can perform the rasterization of characters to be printed in real-time at a rate sufficiently fast enough to keep up with the worst-case data transfer rate required by output processor 52 and image transfer station 20. Because the Column Rasterization Routine 74 operates on an interrupt demand basis, the entire rasterization process may be carried out as a concurrent process, rather than as a sequential-type process of the prior art. This allows for the optimum utilization of the minimum processing power and storage required to keep up with the worst-case data transfer rate of the output processor 52.

In the preferred embodiment, printhead assembly 22 is primarily comprised of a printhead that is a single column 300 dpi (dots per inch) thin film thermal printhead with associated integrated circuit drivers, Model KFT-22-12MPE1-PA available from Kyocera International of Framingham, Mass. The Model KFT-22-12-MPE1-PA printhead consists of a single column of square heating elements, each heating element being electrically connected to a driver circuit for electronically controlling the head temperature of the heating element. The Model KFT-22-12MPE1-PA thermal printhead uses 256 heating elements serially driven by four 64 bit driver chips. Using the serial data received in the four driver chips (HIGH to print and LOW to not print), the printhead applies a printing voltage to each heating element to thermally transfer the square area corresponding to that heating element from ribbon 32 to tape 31. The maximum transfer rate for a printhead assembly 22 can be calculated by multiplying the number of pixels in a column by the number of pixels per inch by the rate of travel of the tape 31 in inches per second. For example, for the Model KFT-22-12MPE1-PA thermal printhead: (256 pixels/column)×(310 pixels/inch)×(1 inch/sec)=48,360 pixels/sec. In other words, when tape 31 is transported past the printhead assembly 22 at a rate of 1 inch/second, the total number of bytes worth of information needed by the driver chips for the printhead is approximately 6,000 bytes/sec. Because the characters being printed may overlap and are more than a single column wide, the output processor 52 must be capable of providing the printhead assembly 22 at a rate slightly greater than the maximum transfer rate.

The insertion of the intermediate step of creating the Edge List Data Base 70 also allows the present invention to realize a substantial saving in the amount of storage required. In a typical laser printer having a resolution of 300 dpi (dots per inch), somewhere between one-half to one million bytes of storage are needed to process an entire 8½ by 11 inch page. In the present invention, a nominal 8,000 byte buffer is all that is required to enable printing apparatus 10 to achieve a continuous printing rate of one inch per second. In addition to the difference in output requirements for a tape printing apparatus, the present invention is more efficient because of the manner in which it generates and manipulates the information contained in Edge List Data Base 70. Essentially, the manner in which information is stored in the Edge List Data Base 70 allows Column Rasterization Routine 74 to accomplish the "fill-to-edge" rasterization process by performing two additive steps, instead of having to solve a polynomial equation as is typically required by prior art rasterization systems.

RASTERIZATION SOFTWARE

Referring now to FIG. 4, the software that controls the functioning of the preferred embodiment of the rasterization processor 50 will be described. In the preferred embodiment of the present invention, the software modules for the rasterization processor 50 are written in C programming language. From a data flow perspective, the software is divided into several modules and data bases that perform a particular group of functions or store a particular type of data. Each module or data base is linked to the remaining modules or data bases as required by a data path, a control path, or both. The concept of modular programming and data structures is well-known in the art.

Briefly, the INPUT MODULE 100 is responsible for transmitting and receiving all data to and from the rasterization processor 50. The COMMAND MODULE 110 is responsible for initiating, controlling and terminating all of the data processing tasks performed by the other modules. The METRIC MODULE 120 is responsible for handling all of the font and metric data, i.e., the data and control points that describe the outlines and other characteristics of the various type fonts. The FORMAT MODULE 130 is responsible for all manipulations of the data to be printed, including horizontal and vertical formatting. THE OUTLINE MODULE 140 is responsible for generating the outline of the selected character based upon the font and metric data. In generating the outline of the selected character, the OUTLINE MODULE 140 uses the TRANSFORM MODULE 150 to transform the size and origin of the control points that define the outline of the character. The EDGE LIST MODULE 160 is responsible for taking the outlines and compiling a list of edge crossing points for each column that are stored as edge segments and retrieved as column crossing points. The RASTERIZE MODULE 170 retrieves the column crossing points stored by the EDGE LIST MODULE 160 on a column-by-column basis and fills in the pixels between edge crossing points to generate the pixel data for filling the FIFO buffer 54. The BIT MAP MODULE 180 is responsible for retrieving those characters or symbols that are stored as complete bit maps, rather than as outlines. The RASTERIZE MODULE 170 transfers these bit maps directly to the FIFO buffer 54 without performing a rasterization on the data.

Figure 5A:
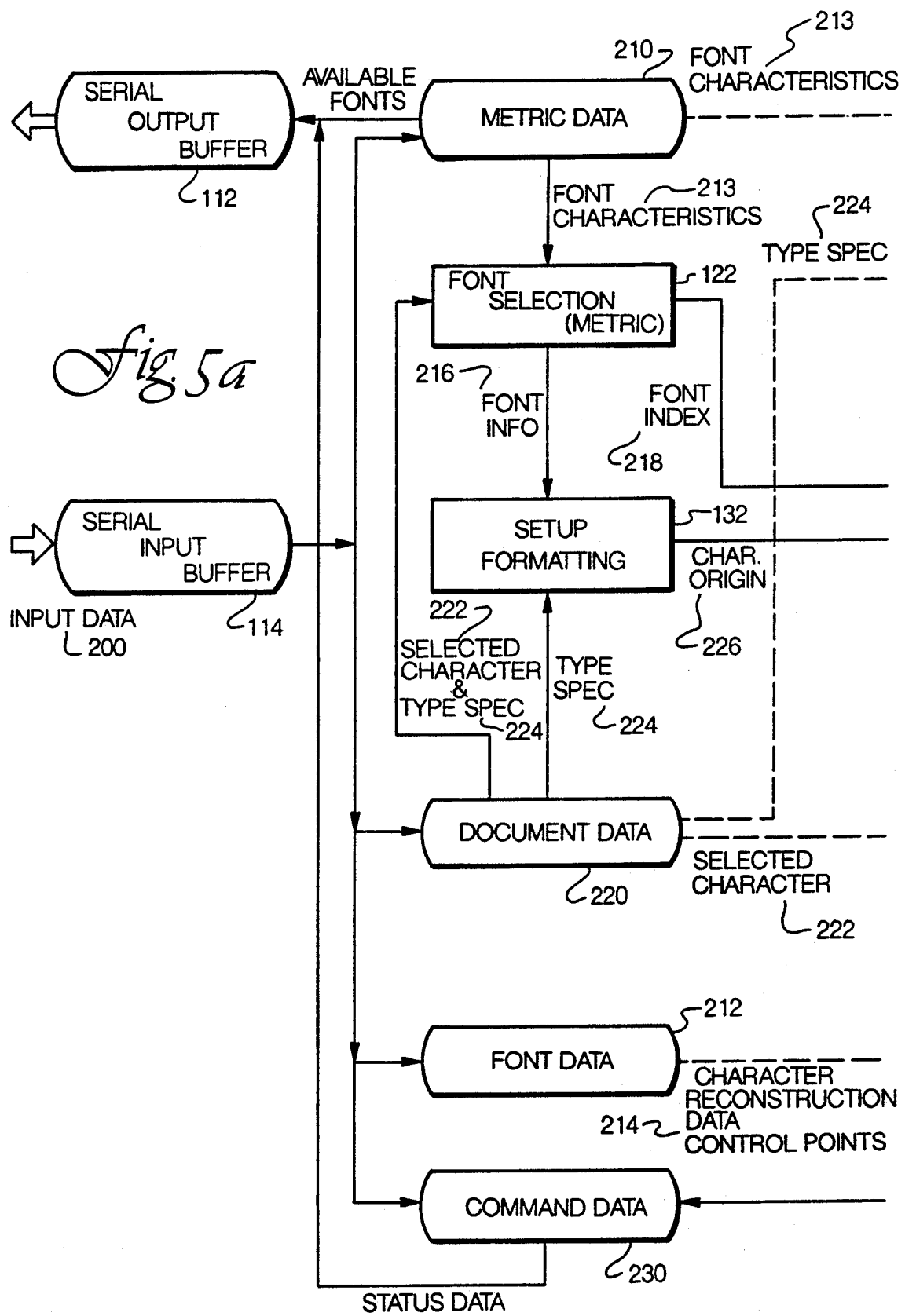
FIG. 5 comprises FIGS. 5a and 5b which are a flowchart of the software program for the rasterization processor of a preferred embodiment of the present invention.

In order to more completely explain the functioning of the software modules shown in FIG. 4, it is helpful to represent the various relationships among the actual processing steps, data bases and data flow for the rasterization processor 50. Referring now to FIG. 5, the actual processing steps, data bases and data flow of the software for the rasterization processor 50 are represented. The type of information or data passing between successive steps is identified next to the connection between processing steps. The processing steps are divided into two overall functions—Setup and Print Run processing. Setup processing steps refer to processing activities that take place prior to the printing of any data and are represented by solid connections between steps. Print Run processing steps refer to processing activities that take place as the data is being printed and are represented by dotted connections between steps.

INPUT MODULE

The INPUT MODULE 100 is responsible for transmitting and receiving all data to and from the rasterization processor 50. The INPUT MODULE 100 receives INPUT DATA 200 comprised of METRIC DATA 210, FONT DATA 212, DOCUMENT DATA 220 and COMMAND DATA 230 through a serial communication link on an interrupt basis. The METRIC DATA 210 is comprised of the characteristics associated with a particular font (e.g. transformation information, name of the font, etc.) The FONT DATA 212 is comprised of the actual character outlines in the form of Control Points 214 for a Move 84 (one coordinate), a Line 82 (two coordinates), or a Curve 80 (four coordinates). The DOCUMENT DATA 220 is comprised of Character Data 222, the desired characters to be printed, and Type Specifications 224, the attributes assigned to those characters (e.g. font, size, style, format). The COM- MAND DATA 230 represents command and other types of control information to the printhead assembly 20 (e.g. advance tape, cut tape, out of tape, etc.). All of the information is received by the INPUT MODULE 110 through the Serial Input Buffer 112 and then transferred to the appropriate data base by the particular module that handles that data base. Because the METRIC DATA 210 and the FONT DATA 212 may also be needed by the input means 40, the INPUT MODULE 100 will upload the METRIC DATA 210 associated with a particular font to the input means 40 by sending it through the Serial Output Buffer 114 in response to a request in the COMMAND DATA 230. The INPUT MODULE 100 also transmits status commands and command responses through the Serial Output Buffer 114 as part of handling the COMMAND DATA 230.

The routines that comprise the INPUT MODULE 100 in the preferred embodiment include: a routine that puts a character into the Serial Input Buffer 112, if there is space; a routine that gets a character from the Serial Output Buffer 114; a routine that determines whether more characters are to be transmitted from the Serial Output Buffer 114; a routine that initializes the UART after power-up; a routine that initializes the host transmission device after power-up; a routine that gets the next available character from the Serial Input Buffer 112; a routine that determines whether there is space available in the Serial Output Buffer 114; a routine that determines whether there is a character available in the Serial Input Buffer 112; a routine that puts a character into the Serial Output Buffer; and a routine that handles the interrupts for the serial communications.

COMMAND MODULE

The COMMAND MODULE 110 has responsibility for initiating, controlling, and terminating all of the data processing handled by the rasterization processor 50. It communicates with the INPUT MODULE 100 to handle all control and error conditions, as well as the uploading of the METRIC DATA 210 associated with a particular font. The COMMAND MODULE 110 also receives and interprets various commands or instructions contained in the COMMAND DATA 230 (e.g. print 5 copies, cut tape, etc.). In short, the COMMAND MODULE 110 can be thought of as the supervisor for all of the other modules that do the actual processing of the characters to be printed.

The routines that comprise the COMMAND MODULE 110 in the preferred embodiment include: a routine that transfers the DOCUMENT DATA 220 to the FORMAT MODULE 120; a routine that initiates a tape width request to the output processor 52; a routine that initializes the data processing modules (OUTLINE MODULE 140, EDGE LIST MODULE 160, and RASTERIZE MODULE 170) to get ready for a Print Run; routines that are called by the processing modules to indicate that they are finished processing; a routine that controls the number of copies of the DOCUMENT DATA 220 to be run based on the sequence information and the number of repeats requested; a routine that determine the action to take after a Print Run; a routine that starts up a Print Run; routines that handles various commands in the COMMAND DATA 230, including Start Print, Continue Print, Abort Print, Download Font, Upload Face Metrics, Upload Face List, Available Face Name Request, Integrity Request, Current Software Version, Warm Stop, Head Controller Information Request; a routine that clears a previous printer error; a routine that shuts the program down in the event of a non-recoverable error; a routine that initiates a non-recoverable error print termination; a routine that makes the printer status available to other modules; a routine that initiates a recoverable error termination; a routine that handles an unsolicited error received by the output processor 52; and a general command handler polling loop.

METRIC MODULE

The METRIC MODULE 120 has responsibility for handling all of the METRIC DATA 210 and FONT DATA 212, including font selection. When the METRIC MODULE 120 receives the METRIC DATA 210 and FONT DATA 212 from the INPUT MODULE 100, a list of all of the available fonts by face name is generated. Font Information 216 associated with a particular font is generated by a Font Selection Routine 122 based upon the font characteristics of the METRIC DATA 210 and the Character Data 222 and Type Spec Data 224 of the DOCUMENT DATA 220 being processed. When a particular font is selected by its face name in the DOCUMENT DATA 220, the Metric Module 120 sets the proper pointers in the software to the font and metric data for the selected font in the form of a Font Index 218. During the Run Time Processing, the METRIC MODULE 120 is responsible for providing the control points for the outline of the characters to the TRANSFORM MODULE 150. Retrieve Character Data 124 takes the Selected Character Data 222 from the DOCUMENT DATA 220 and the Selected Font Data 242 from the FORMAT DATA 240 to retrieve the character reconstruction data that comprises the point, line and curve Control Points 214 from the FONT DATA 212 and presents that data to the TRANSFORM MODULE 150.

The routines that comprise the METRIC MODULE 120 in the preferred embodiment include: an initialization routine; a routine that returns a selection weighting for selecting the font to be used if the request font is not available; a routine that compares the face name of the requested font to the available face names and returns pointers to the face name if it was available; a return to add a facename and font to the available fonts; a routine that returns a bit map font index if all font conditions (particularly font size) are met; a routine that sets up a font parameter record using data extracted from the METRIC DATA 210; a routine that determines the total length of the METRIC DATA 210 associated with a particular face name; a routine that selects the desired font cartridge 16 or 18; a routine that determines whether a specified font has a particular face available; a routine that uploads the METRIC DATA 210 associated with a particular face name; a routine that determines whether a specified facename is available in the facename directory; a routine that provides a list of the available faces in the facename directory to the INPUT MODULE 100 to be uploaded; a routine that returns the character width for the selected character and facename; a routine that adds a new font to the font directory; a routine that searches the font cartridges 16 and 18, as well any resident memory (i.e. ROM memory), for available or resident METRIC DATA 210 and FONT DATA 212; a routine that selects the FONT DATA 210 for a selected character; a routine that selects the best alternative font if the desired font or facename is not available; a routine that gets the next font data segment for use by the OUTLINE MODULE 130 and also adds any underlining or construction of composite characters, if required; a routine that sets up a pointer to the bit map data for a selected character; a routine that retrieves super and and subscript information for a selected facename; and a routine that returns kerning information about the selected character for the selected facename.

FORMAT MODULE

The FORMAT MODULE 130 has responsibility for all manipulations of the DOCUMENT DATA 220, including horizontal and vertical formatting. The FORMAT MODULE 130 performs two formatting passes on the DOCUMENT DATA 220, Setup Formatting 132 and Run Time Formatting 134. Setup Formatting 132 utilizes the Font Information 216 and the Type Spec Data 224 to generate a Character Origin 226 for the first character of the Character Data 222 and for the first character each time a new font is selected. Both the Font Index 216 and Character Origin 226 are stored in a temporary data file known as the FORMAT DATA 240 to be utilized during the Run Time processing. Run Time Formatting 134 utilizes the Font Characteristics 213 stored in the METRIC DATA 210 to generate information about the Character Size 228, i.e. selected point size, and the Character Format 229, i.e. bold, italic, underline, etc. The Character Size 228 is used by the TRANSFORM MODULE 150 in generating the proper outline for the selected size and font of the character being printed. The Character Format 229 is used by the OUTLINE MODULE 140 to determine the actual outline for the particular format of the character being printed.

The routines that comprise the FORMAT MODULE 130 in the preferred embodiment include: a routine that determines whether a pointer to the DOCUMENT DATA 230 is at the end of a line; a routine that determines whether a pointer to the DOCUMENT DATA 230 is at the end of a page; a routine that copies a paragraph of information in the DOCUMENT DATA 230; a routine that interprets the Type Spec Information 224; a routine that identifies a character as being a Type Spec Information 224; a routine that sets up the required font based on the current document parameters; a routine that finds the next printable character in the DOCUMENT DATA 230; a routine that copies a parameter set for a given string of printable characters; a routine that finds the tab type at the next tab stop position; a routine that calculates the width and origin offset of the current character; a routine that calculates the ascent and decent of the current character from the origin offset; a routine that calculates the extra width due to italicizing; a routine that formats an entire line of information by positioning each of the character origins along the x axis; a routine that formats an entire page of information by positioning each of the character origins along the y axis; a routine that initialize the FORMAT MODULE 130 after power-up; a routine that determines whether it is necessary to cut the tape 31 in formatting a page of information; a routine that determines whether a pointer to the DOCUMENT DATA 230 is at the end of a document; a routine that determines whether the tape 31 should be marked for creating an alignment of successive strips of tape in formatting a page of information; a routine that initialize the rasterization processor 50 to receive a new document; a routine to set up the sequence parameters after a document has been downloaded into the DOCUMENT DATA 230; a routine that resets the sequence count for each document printing (i.e. resets counters for copies); a routine that initializes the rasterization processor 50 prior to printing a page of information; a routine that loads the current background fill pattern to be printed; a routine that gets the current width of the tape 31; a routine that gets the current state of the mirror variable that controls whether the characters in the DOCUMENT DATA 230 will be printed out as mirror images; a routine to advance the document pointers to the DOCUMENT DATA 230 from the end of a page to the start of the next page and prepare the next page for printing; a routine that determines whether a sequence character is found in the DOCUMENT DATA 230; a routine that selects the next character during actual printing; a routine that reset the document pointers to the DOCUMENT DATA 230 so that the previous page can be reprinted; and a routine that determines whether a pause character is found in the DOCUMENT DATA 230.

OUTLINE MODULE

The OUTLINE MODULE 140 has responsibility for computing the coordinates of each point of the outline for each character to be printed. As shown in FIG. 3, the character outline definitions are stored as a series of coordinates that represent the control points of a Bezier Curve 80, the endpoints of a Line 82, or a Move 84 to a new point. Together these three types of coordinates are referred to as the Character Reconstruction Control Points 214 stored in the FONT DATA 210 as shown in FIG. 5. When a new character is created, the OUTLINE MODULE 140 calls the FORMAT MODULE 130 to get the parameters for Character Format 229 and then passes these parameters to the EDGE LIST MODULE 160. The OUTLINE MODULE then calls the TRANSFORM MODULE 150 that retrieves the Control Points 214, the Type Spec Information 224, the Character Origin 226, and the Character Size 228 to generate the Transformed Control Points 244 for the new character using the appropriate transform matrix. Create Character Outline 142 takes the Transformed Control Points 244 and generates the Edge Points 252 for each line or curve segment that comprises the new character. After the points for the line or curve specified by each segment are generated, they are passed to the Differential Encoding & List Entry 162 for storing the Edge Segments 254 in the EDGE LIST DATA BASE 250. The method and data structure for storing the Edge Segments 254 is explained in more detail in connection with the description of FIGS. 6–12.

The routines that comprise the OUTLINE MODULE 140 in the preferred embodiment include: a routine that generates the Edge Points 252 for a specified Line 82; a routine that generates the points of a specified Curve 80; a routine that initializes the OUTLINE MODULE 140 after a power-up; a routine that causes the OUTLINE MODULE 140 to begin the outlining process; and the Outline Handler Routine. The Outline Handler Routine is called repeatedly by the COMMAND MODULE 110 and will perform one or more functions if the state variable for that particular function is set. The purpose of the Outline Handler Routine is to break up the outlining process so that the process can be demand driven, i.e., when there is a need for more outline information in the FIFO Buffer 54, the COMMAND MODULE 110 will execute more calls to the Outline Handler Routine. If the rasterization processor 50 is busy with other activities and the FIFO Buffer 54 is full, then the COMMAND MODULE will not execute as many calls to the Outline Handler Routine.

TRANSFORM MODULE

The TRANSFORM MODULE 150 has responsibility for handling all of the coordinate transformations required by the OUTLINE MODULE 140 to generate the appropriate size outline for the selected character and font based upon the Control Points 214 for that particular font. The TRANSFORM MODULE 150 accomplishes the transformation by setting up a transformation matrix for each new character that will perform the necessary calculations on the Control Points 214 to produce the Transformed Control Points 244.

The routines that comprise the TRANSFORM MODULE 150 in the preferred embodiment include: a new transform routine that causes the TRANSFORM MODULE 150 to construct a new transformation matrix for a new character; a change transform parameters routine due to the construction of composite characters; a set offset routine that sets up the TRANSFORM MODULE 150 to perform mirror imaging of the character being transformed; and a transform point routine that performs the actual transformation for each pair of coordinates representing the outline of the selected character using the previously set up transformation matrix.

The transformation matrix is constructed by multiplying together the following matrices shown in Tables 1-4 in the specified order: Scaling Matrix * Italicizing Matrix * Rotation Matrix * Translation Matrix.

TABLE 1

| SCALING MATRIX | | |
|---|---|---|
| Sx | 0 | 0 |
| 0 | Sy | 0 |
| 0 | 0 | 1 |

In Table 1, Sx is the scale factor for the x axis, and is computed by multiplying together the point size, the superscale factor and the horizontal expansion/contraction for the selected character. Similarly, Sy is the scale factor for the y axis, and is computed by multiplying together the point size, the syperscale factor and the vertical expansion/contraction for the selected character.

TABLE 2

| ITALICIZING MATRIX | | |
|---|---|---|
| 1 | 0 | 0 |
| tan0 | 1 | 0 |
| 0 | 0 | 1 |

In Table 2, tan 0 is the tangent of the angle between the vertical and the dominant character vertical. If it is 0, then this matrix multiplication is not required.

TABLE 3

| ROTATION MATRIX | | |
|---|---|---|
| a | b | 0 |
| −b | a | 0 |
| 0 | 0 | 1 |

In Table 3, if rotation is required for the selected character, a=0 and b=1. If rotation is not required, then a=1 and b=0, in which case this matrix multiplication is not performed.

TABLE 4

| TRANSLATION MATRIX | | |
|---|---|---|
| 1 | 0 | 0 |
| 0 | 1 | 0 |
| Tx | Ty | 1 |

In Table 4, Tx is the translation required in the x axis and Ty is the translation required in the y axis.

It should be noted that it is not necessarily required to recalculate the entire translation matrix each time a parameter changes, as it may be possible to store intermediate results for a given character. However, the translation matrix will always change for each new character.

EDGE LIST MODULE

The EDGE LIST MODULE 160 has responsibility for handling the storage of the Edge Points 252 generated by the OUTLINE MODULE 140. When the OUTLINE MODULE 140 is processing a new character, it calls a New Character routine in the EDGE LIST MODULE 160 to indicate that a new character is to be added to the EDGE LIST DATA BASE 250, and to specify the plotting characteristics of the new character (e.g., the fill patterns, fill rule, etc.). Each time the OUTLINE MODULE 140 encounters a new edge segment to the character being outlined, a New Edge routine is called in the EDGE LIST MODULE 160 to specify the starting coordinates of the starting point of the new edge for the character being created. As the OUTLINE MODULE 140 generates each Edge Point 252, it calls an Add Point routine in the EDGE LIST MODULE 160 with the displacement of the new Edge Point 252 from the last Edge Point 252 that was plotted. When all of the Edge Points 252 have been generated and stored for the character, the OUTLINE MODULE 140 issue a call to an End Character routine in the EDGE LIST MODULE 160 to indicate that the character has been completed.

The EDGE LIST DATA BASE 250 is later used by the RASTERIZE MODULE 170 when it need new column data. When this happens, a Get Column Data routine in the EDGE LIST MODULE 160 is called asking for a specific column of data. The EDGE LIST MODULE 160 searches the EDGE LIST DATA BASE 250 for any characters that contribute to the specified column and returns the column data for that character. Call to the Get Column Data routine are repeated until the EDGE LIST MODULE 160 indicates that there are no more characters in the specified column.

The routines that comprise the EDGE LIST MODULE 160 in the preferred embodiment include: an insert routine that adds a new row to the column data array; an allocate space routine that allocates space in the EDGE LIST DATA BASE 250; a Store Edge routine that stores the current edge; and End Edge routine that terminates the current edge; an Add List routine that adds an edge list entry to the master edge list entry; a Process Edge routine that processes the specified edge and produces the column data; a Store Point routine that stores the specified point for the main edge if there is no stroking or the upper edge if there is stroking; a Store Lower Point routine that stores the lower edge of an edge segment if there is stroking; a Store Forward routine that stores points for upper and lower curves of a forward edge; a Store Reverse routine that stores points for upper and lower curves of a reverse edge; an Add Stroke Point routine that adds a new point to a stroked character edge list; a New Stroke routine that sets the maximum and minimum rows for each column of the stroking pen tip if stroking is selected; and End Stroke routine that outputs the final point when a stroked edge is completed; an Initialize Bold Pens routine that is called on power-up; an Initialize Round Pens routine that is also called on power-up; and an Initialize Edge Module routine call on power-up; a Start Edge routine called before printing is to start; a Free Space routine that determines how much free space is available in the EDGE LIST DATA BASE 250; a New Character routine that prepares the EDGE LIST MODULE 160 for a new character definition, including shadow offsets and stroking pen numbers (if any) and allocating and initializing the edge list headers; a New Edge routine that starts a new edge record, if the new edge is a forward edge, the specified coordinates will be the first point on the edge and if the new edge is a reverse edge, the specified coordinates will be the last point on the edge; an Add Point routine that adds a point to the edge currently being constructed; an End Character routine that handles processing when a character is complete, including resolving the shadow and stroking conditions; and a Get Column Data routine that computes the column data for the specified column and passes that data as Column Crossings 256, along with any plotting characteristics for the data in the form of Character Format 229, to the RASTERIZE MODULE 170.

RASTERIZE MODULE

The RASTERIZE MODULE 170 has responsibility for taking the Column Crossings 256 provided by the EDGE LIST MODULE 160 and producing the Column Bit Data 258 that will be sent to the FIFO Buffer 54 and on to the printhead assembly 20. When the output processor 52 is ready to accept print data, it will signal the RASTERIZE MODULE 170 by an interrupt that is handled by a Printer Interrupt routine and the RASTERIZE MODULE 170 will begin filling the FIFO Buffer 54 with the Column Bit Data 258. The RASTERIZE MODULE 170 stops filling the FIFO Buffer 54 when it is full or when there is no more Column Bit Data 258 to be printed, i.e. the end of the line being printed. Other than the initial request condition, the FIFO Buffer 54 is filled by the RASTERIZE MODULE 170 asynchronously from the rate at which it is emptied by the output processor 52. When the output level of the FIFO Buffer 54 drops below a preset level, a flag is set by the OUTPUT MODULE 140 which then signals all of the other modules of the rasterization processor 50 that the RASTERIZE MODULE 170 needs to run. This process allows the rasterization processor to maintain the real-time rasterization rate required by the output processor 52, while minimizing the amount of buffer storage required to store the Column Bit Data 258 as it is generated.

The routines that comprise the RASTERIZE MODULE 170 in the preferred embodiment include: a Gen Bit Map routine that generates the actual Column Bit Data 258 from the Column Crossings 256, with each Column Crossing 256 having a winding value that is accumulated as the routine processes each of the Column Crossings 256 for a specified column and pixels are generated if the winding rule is satisfied or if a vertical line is present; a Mask In Bit Map Data routine that copies the bit map data from the BIT MAP MODULE 180 into the FIFO Buffer 54; an initialization routine run on power-up; a routine called by the EDGE LIST MODULE 160 and the BIT MAP MODULE 180 that returns the column number currently being rasterized; a routine called by the COMMAND MODULE 100 to set up the background fill pattern; a routine called by the COMMAND MODULE 100 to force a premature completion of the rasterization; a Start Rasterizer routine called by the COMMAND MODULE 100 before printing is started; a Rasterized Handler routine that is repeatedly called until all of the data in the EDGE LIST DATA BASE 250 has been rasterized; and a Printer Interrupt Handler routine that handles interrupts from the output processor 52.

BIT MAP MODULE

The BIT MAP MODULE 180 has responsibility for transferring the font information directly to the RASTERIZE MODULE 170 for those characters for which there is already a bit map present in the FONT DATA 212. The break even point between current bit mapping techniques and the techniques of the present invention is a character size some place between 12-14 points. Characters above that size are more efficiently represented and rasterized with the present invention, whereas characters below that size are more efficiently represented using bit map techniques. Accordingly, in the preferred embodiment of the invention, for each such character, the following information is stored in FONt DATA 212: the character width in Font Metric Units, the image width in pixels, the image height in number of word needed to span the pixel height, the image's x offset from the character origin in pixels, the image's y offset from the character origin in pixels, and the bit image. Bit map data is requested from the BIT MAP MODULE 180 by the RASTERIZE MODULE 170 when it needs new column data and one of the active characters for that column is a bit mapped character. The BIT MAP MODULE 180 then executes a repeated series of calls to a Get Column routine to provide the RASTERIZE MODULE 170 with all of the columns-worth of data for the bit mapped character. The BIT MAP MODULE 180 also maintains an active and available list of bit mapped characters so as to conserve on the storage space required for the bit mapped characters.

The routines that comprise the BIT MAP MODULE 180 in the preferred embodiment include: a routine to remove a character from the active character list and place it on the available character list; a routine to initialize the BIT MAP MODULE 180 on power-up; a routine that retrieves the bit mapped Font Data 212 for a character, adds the character to the active list and remove the character from the available list; and the Get Column routine that is called when the RASTERIZE MODULE 170 need another column of information.

SAMPLE RASTERIZATION

Figure 7:
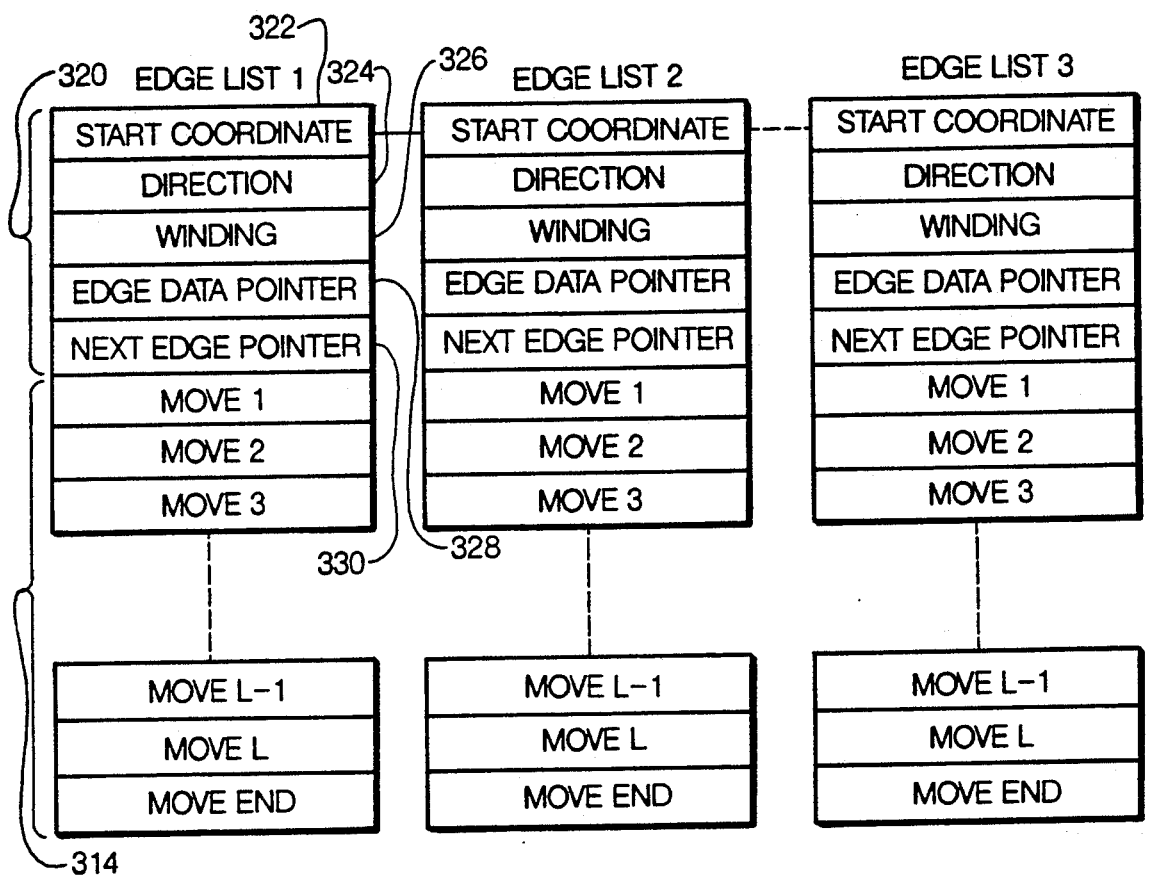
FIG. 7 is a detailed block diagram showing the edge data for the edge header records of the Edge List Data Base.
Figure 8:
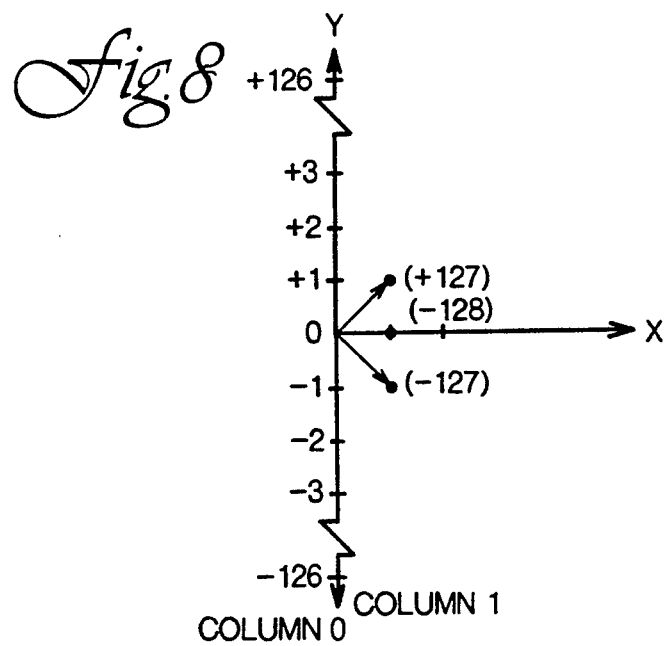
FIG. 8 is schematic diagram showing the method of storing edge data values for the Edge List Data Base.
Figure 9:
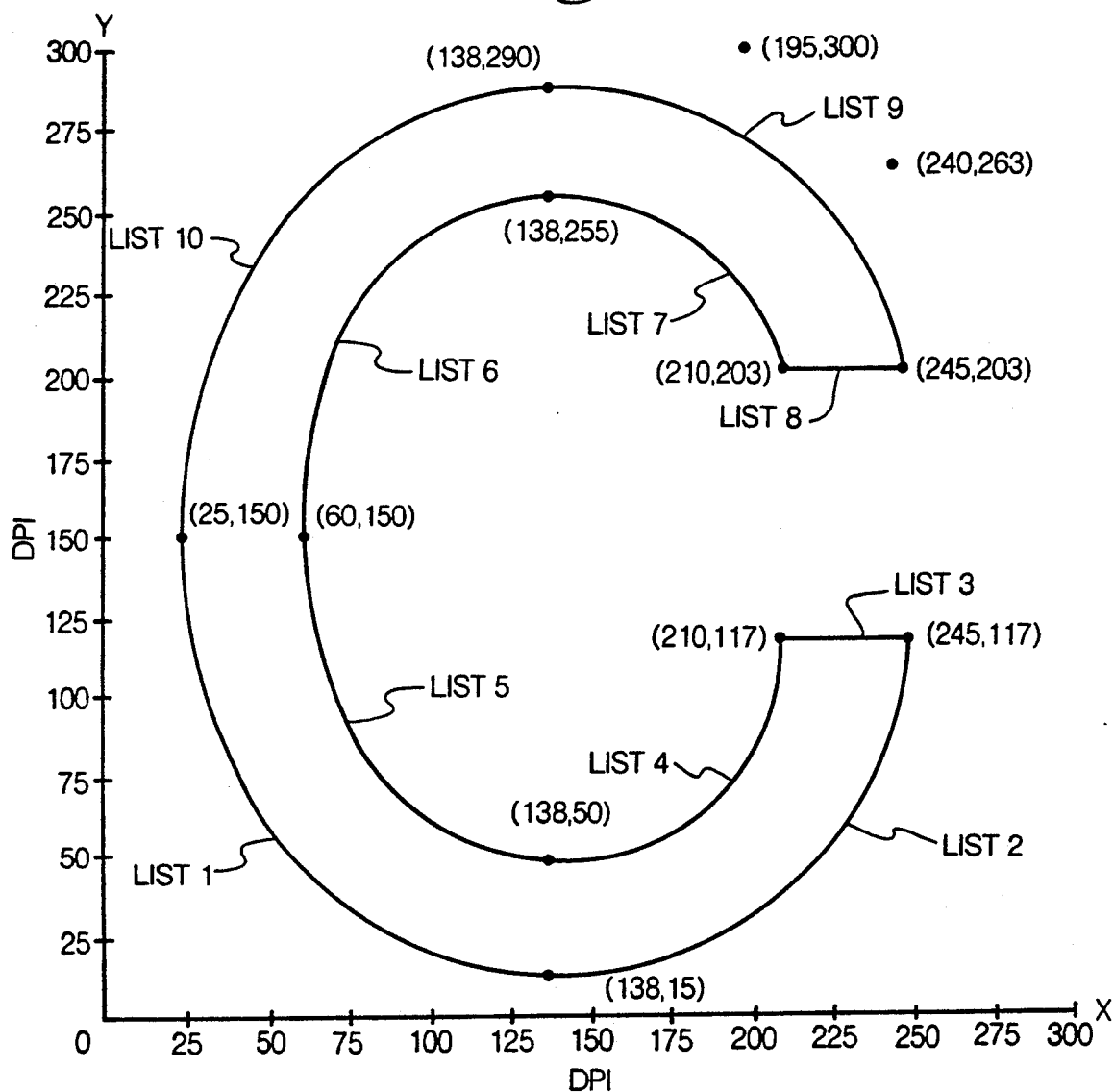
FIG. 9 is an enlarged representation of the edge lists of a sample character to be represented by the present invention.

Referring now to FIGS. 6-12, the method and system for storing the data values in the EDGE LIST DATA BASE 250 will be discussed in greater detail for a sample character "C" as shown in FIG. 9. In a preferred embodiment of the present invention, FONT DATA 212 is represented as a series of data points corresponding to a Bezier curvlinear font representation of the outline of each character in the font set. As is well known in the prior art, a Bezier representation scheme allows a single font character set to be stored in a normalized format and then compressed or expanded to the desired point size using any number of standard enlargement, reduction, and/or smoothing algorithms. It will be seen that other types of font representations could be used with the present invention for generating the desired Edge Points 252 that are stored as Edge Segments 254 in the EDGE LIST DATA BASE 250.

The character "C" shown in FIG. 9 is represented as the outline formed by ten curve segments (Lists 1, 2, 4, 5, 6, 7, 9 and 10) and line segments (Lists 3 and 8). The dimensions on the x and y axis of FIG. 9 are in pixels, each representing one pixel to be printed by the printhead assembly 10. The curve segments and line segments are generated by a set of Character Reconstruction Control Points 214 for each curve or line that are used by the OUTLINE MODULE 140 and the TRANSFORM MODULE 150 to generate a sequence of Edge Points 252 for each of the ten segments that make up the character "C" for this particular font. For example, the four Character Reconstruction Control Points 214 for List 9 are represented by the coordinates (138,290), (195,300), (240,263) and (245,303). The actual values of the Character Reconstruction Control Points 214 are determined by the TRANSFORM MODULE 150 based on the Character Size 228, Character Origin 226, and Font Characteristics 213 of the Selected Character 222. The outline of the character is offset from the Character Origin 226 by an amount determined from the particular font and size of the character being printed as calculated by the FORMAT MODULE 130. The outlines for the segments are generated in an arbitrary order as specified by the designer of the particular font. The font outline is generated by beginning at this arbitrary point and tracing a closed outline cruves to represent the desired character. In the case of the character "C" as shown in FIG. 9, the beginning point of the outline is the point (25,150) that starts List 1. The reason that the outline of the character is broken into the segments represented by Lists 1–10 is so that each change in direction of a Curve 80 will start a new Edge Segment 254. As a result, each edge list element in the EDGE LIST DATA BASE 250 will represent only one column crossing/column and an Edge Segment 254 will never loop back on itself.

Figure 6:
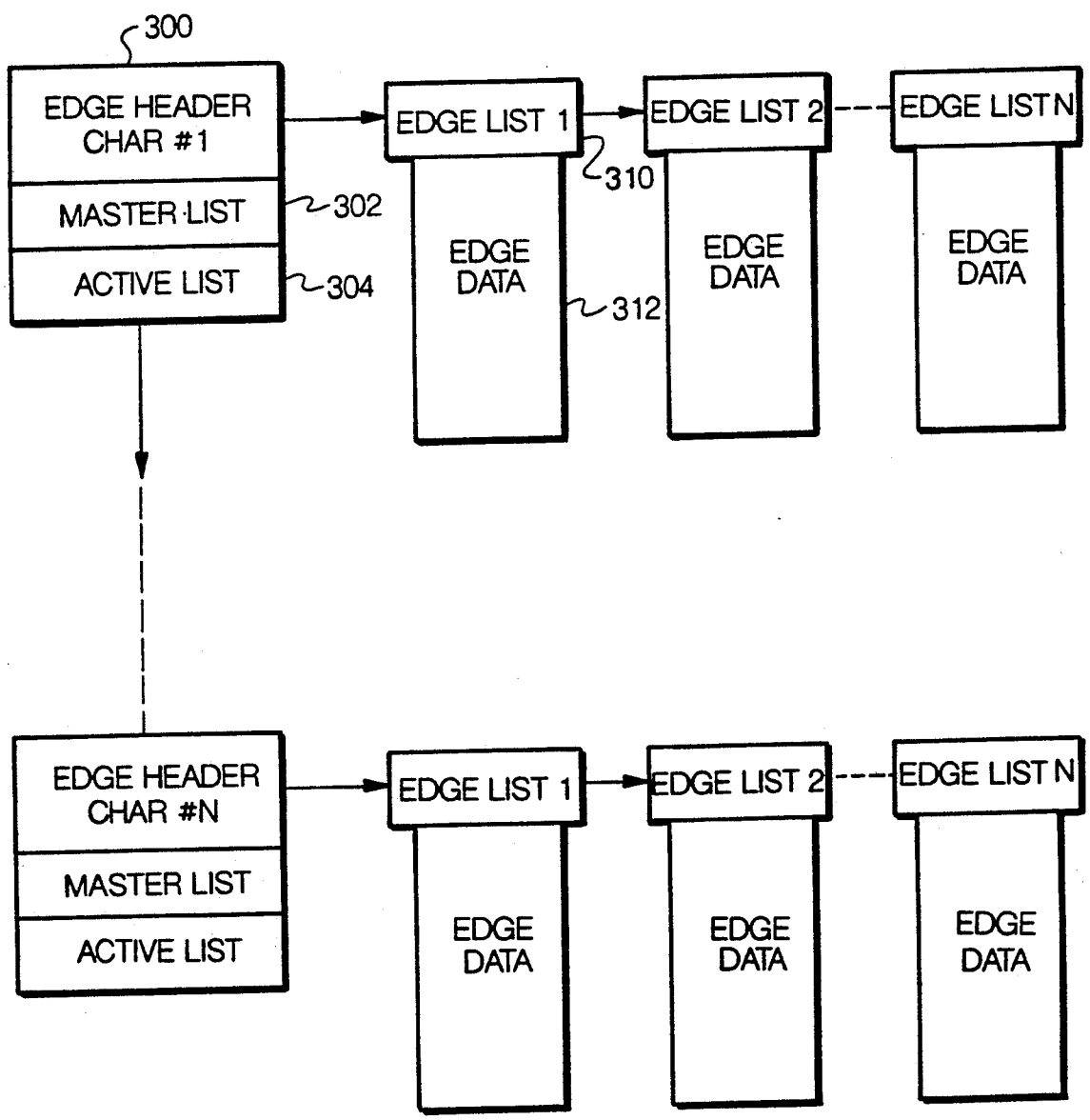
FIG. 6 is a block diagram of the edge header records of the Edge List Data Base of the present invention.

Referring now to FIG. 6, the function and data structures of the EDGE LIST DATA BASE 250 and the EDGE LIST MODULE 160 will be described. Each character is represented in the EDGE LIST DATA BASE 250 as an Edge Header 300 having a Master List and an Active List 304 that point to a series of Edge Lists 310, Each Edge List 310 contains the Edge Data 312 that represents the Edge Segment 254 corresponding to the particular Edge List 310. The Master List 302 is a sequence ordered list of the memory location in the EDGE LIST DATA BASE 250 of all of the Edge Lists 310 for a given character starting with the left-most Edge List 310. In processing the Edge Lists 310, a second edge header record Active List 304 is used once the RASTERIZE MODULE 170 reaches the first column occupied by the character. When the RASTERIZE MODULE 170 calls for an edge from an Edge List 310 of this character that starts at the current column, the Edge List 310 is removed from the Master Edge List 302 and added to the Active List 304. In other words, the Active List 304 is only those Edge Lists 310 that have Column Crossings 256 for the currently active column that is being rasterized. The use of the Active List 304 allows the EDGE LIST MODULE 160 to more quickly retrieve all of the relevant Column Crossings 256 for a given column.

As shown in FIG. 7, the Edge Data 310 contains a number of control values and a contiguous string of Edge Points 314 whose column numbers increase monotonically. Essentially, the Edge Points 314 represent either a one column horizontal movement, a one column diagonal movement, either up or down, or a vertical movement of any number of pixels along the current column. By using the concept of the Edge Lists 310 and the Edge Points 314, the mechanism for finding the data for the rasterization is embedded in the structure of the data. As a result, to identify all of the necessary data for rasterizing a given column when there are several Edge Lists 310, all that is needed is the x address of the active column. The pointers in the Active List 304 and the corresponding Edge Lists 310 are directed to all of data that the RASTERIZE MODULE 170 will need. The simplicity also minimizes the processing power required to manipulate the data base because the pointers to the Edge Points 314 in the Edge Lists 310 are incremented as each Edge Point 314 is used. This structure allows the EDGE LIST DATA BASE 250 to perform the rasterization of large, i.e. 24 point and larger, characteris in a continuous real-time environment at a low cost.

In the preferred embodiment, the Edge Points 314 are represented as a table of single byte entries, each entry indicating the movement required to advance to the next point on the list. FIG. 8 is a graphical representation of the single byte values used to represent the Edge Points 314. These movements are encoded in 2's compliment form according to the following table:

TABLE 5

| Byte Value | Column Address | Height |
|---|---|---|
| +127 ($7F) | +1 | −1 |
| −128 ($80) | +1 | 0 |
| −127 ($81) | +1 | +1 |
| −126 thru 126 ($01-$7E and $82-$FF) | 0 | +/−126 |

If the Edge Segment 254 being processed was defined from left to right, then the data in EDGE LIST DATA BASE 250 is used in the same order as it is stored. This type of edge or path is referred to as a Forward Edge, e.g., Lists 1, 2, 6, 7, and 8. If the Edge Segment 254 being processed was defined from right to left, then the data in EDGE LIST DATA BASE 250 is used in the reverse order as it is stored, starting at the last point generated. This type of edge or path is referred to as a Reverse Edge, e.g., Lists 3, 4, 5, 9, and 10. In both cases, the RASTERIZE MODULE 170 uses the data stored in the EDGE LIST DATA BASE 250 to follow the Edge Segment 254 from its left most position to its right most position. If while generating the Edge List 310, the EDGE LIST MODULE 160 encounters an Edge Segment 254 that changes directions, the current Edge List 310 is terminated and a new Edge List 310 is generated.

Figure 11:
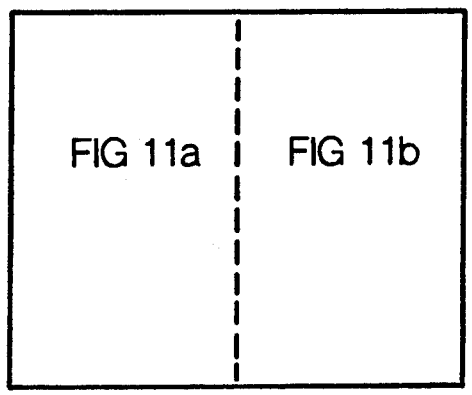
FIG. 11 comprises FIGS. 11a and 11b which are an expanded view of an edge list of the sample character of FIG. 9 showing the individual pixel elements.
Figure 11A:
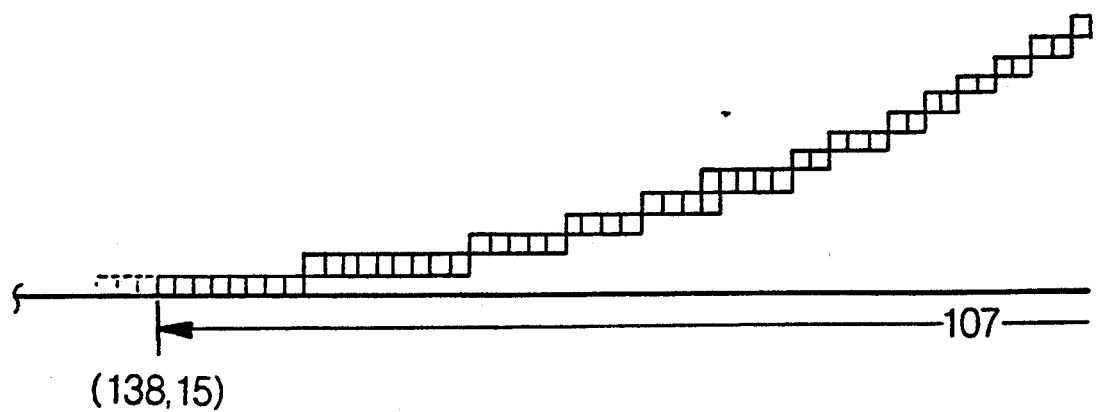
Figure 11B:
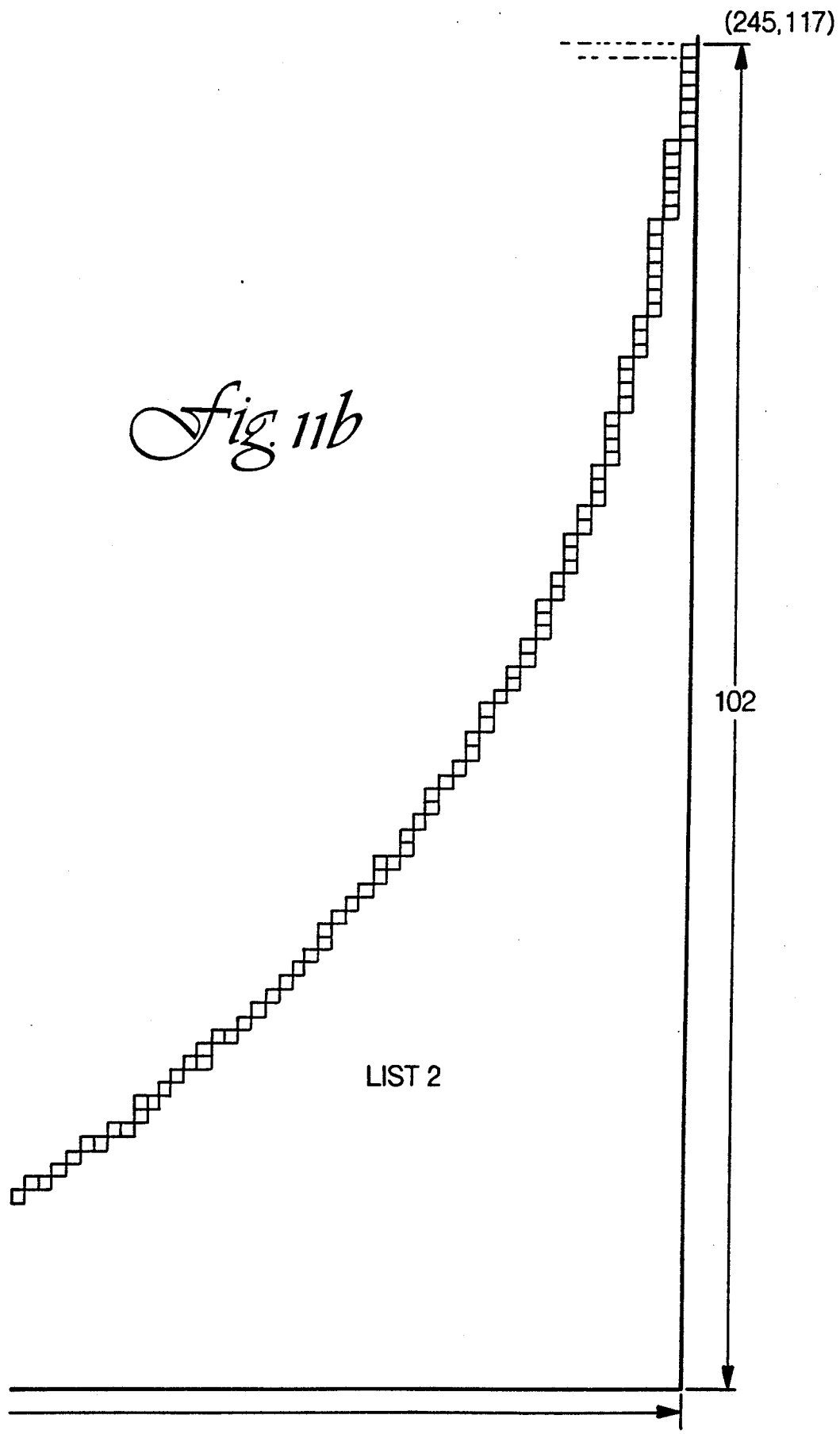

In addition to the Edge Points 314 in an Edge List 310, each Edge List 310 also has a Header Record 320 that contains the information required to use that Edge List 310. For Forward Edges, the Header Record 320 is at the beginning of the Edge List 310; for Reverse Edges, the Header Record 320 is at the end of Edge List 310. Start Coordinate 322 is the coordinate of the right most Edge Point 314 defining the Edge Segment 254 as expressed in relative coordinates from the Character Origin 226. Direction 324 indicates whether this is a Forward Edge (+1) or Reverse Edge (−1). When RASTERIZE MODULE 170 accesses EDGE LIST DATA BASE 250, it uses the value of Direction 324 as the value by which a pointer will be incremented to get to the next byte of information in the Edge List 310. Winding 326 is the direction sense which is used for the winding rule calculation and is either +1 (for a right going edge) or −1 (for a left going edge). Edge Data Pointer 328 is a pointer to the next byte of Data Points 312 for this Edge List 310. Next Edge Pointer 330 points to the Header Record 320 for the next Edge List 310 in the EDGE LIST DATA BASE 250. FIG. 10 shows a portion of the actual data for the Edge Lists 310 that represent the sample character "C" as shown in FIG. 9. FIGS. 11a and 11b show the individual pixels for the segment of the character "C" represented by List 2.

Figure 12:
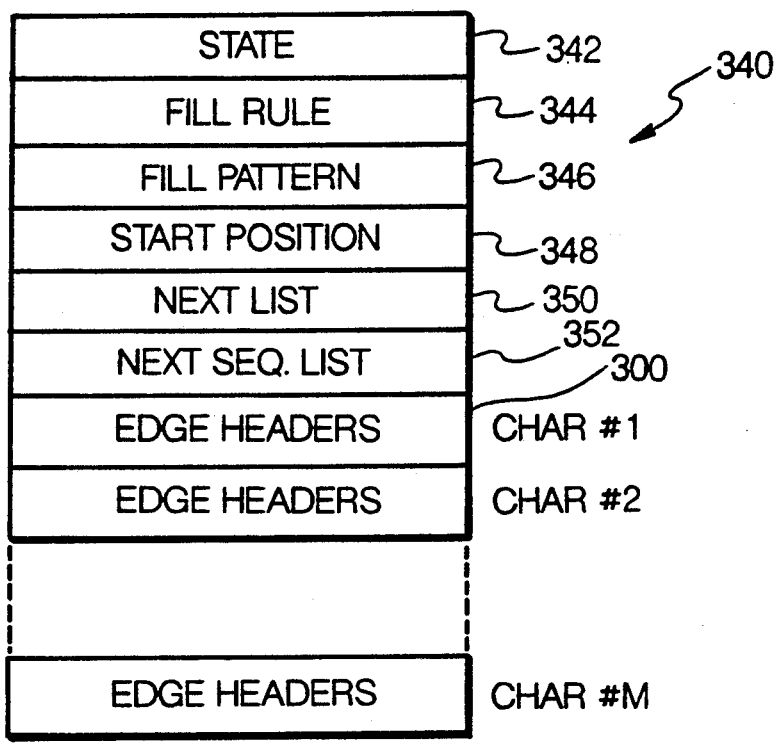
FIG. 12 is a block diagram of the overall edge list structure for the Edge List Data Base of the present invention allowing for more than one type of edge list.

Referring now to FIG. 12, all of the Edge Headers 300 for the various edges representing the outline of a sequence of characters may also be strung together in a linked list by order of increasing starting column number. This linked list is referred to as Master Edge List 330 and is used to control the retrieval and reconstruction of the data representing the selected characters from the EDGE DATA LIST BASE 250. State 342 is the current state of the characters represented by this Master Edge List 340 and indicates whether the Edge List 310 is being created by the OUTLINE MODULE 150, used by the RASTERIZE MODULE 170, or is ready to be recycled. Fill Rule 344 determines the rule to be used in filling the character by the RASTERIZE MODULE 170. A true indicates that the winding rule is to be used, a false indicates that the parity or alternate rule is to be used. As is known in the art, a variety of fill rules may be applied in performing the rasterization of a character outline. The parity or alternate rule indicates that every time an edge or path is crossed for a column, the rasterize switch the current state of filling (either on to off, or vice versa) without regard as to the direction of the path. The winding rule keeps track of the fill status by keeping a sum of the winding values and filling a character if the sum is anything but a zero value. The winding rule is used for more complicated outline characters, such as the # symbol, whereas the parity rule is used for simplier characters. Fill Pattern 346 points to the fill pattern that is to be used in filling this character. Column Position 348 initially represents the left most column occupied by the character. As the character becomes active, X Position 348 is incremented as each column is computed. Next List 350 is a pointer to the next Master Edge List 350 for the next character as order by increasing column number. Next Sequential List 352 is a pointer to the next Edge List 310 in order of creation. Finally, the Edge Headers 300 are the actual Edge Headers 300 and associated Edge Lists 310 as described above.

One of the primary reasons for using a Master Edge List 340 as described is to allow different types of Edge Lists 310 to be stored for the same character or sequence of characters. For example, if a character is to be represented as bold, it is possible to perform the "bolding" by generating a pair of parallel edges that track the original outline of the character, thereby generating the new "bold" outline somewhat in the same way as if a ball was passed through a tube representing the outline of the character and all of the tangential extremes were plotted as the ball moved through the tube. In a similar manner, a shadow effect or outline effect for a character may also be generated based on manipulations of the original character outline as represented in the EDGE LIST DATA BASE 250.

CHARACTER STROKING AND SHADOWING

When a shadow characteristic is specified as part of the Font Information 213 for a Selected Character 222, a "shadow" of the character is first plotted slightly offset from the original location of the character, and then the original character is plotted on top of the offset shadow. Because of the organization of the EDGE LIST DATA BASE 250, it is not necessary to outline the character twice in order to accomplish the shadow effect. Instead, when the OUTLINE MODULE 140 completes the outlining of a character, the EDGE LIST MODULE 160 makes a copy of the Edge Lists 310 for the character and offsets that copy by the required amount. This may be done either by offsetting the Edge Points 314 or by offsetting the Start Coordinate 222. When the RASTERIZE MODULE 170 asks for the column data associated with the shadowed character, the column data for the shadow copy is returned before the column data for the original character, thereby creating the appearance that the shadow is underneath the original character.

When a stroking characteristic is specified as part of the Font Information 213 for a Selected Character 222, two sets of Edge Lists 310 must be generated for the character. Stroking can be selected either because the character is being printed in an outline mode or because it is bolded. One of the sets of Edge Lists 310 represents the edges that make up the character itself, the other set represents the edges that make up the character stroke. The OUTLINE MODULE 140 always generates the normal character outline. If a stroked character is selected, the EDGE LIST MODULE 160 generates the stroke outline. Because of the nature of the EDGE LIST DATA BASE 250, the stroking outline is easily and efficiently generated by manipulating the normal character outline as described below.

Figure 13:
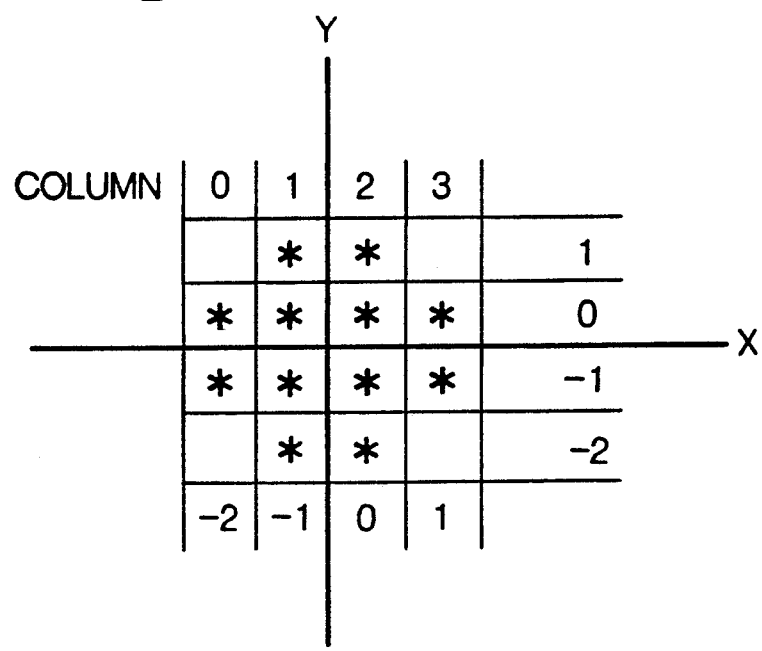
FIG. 13 is a schematic diagram showing the pixel pattern of a pen tip used in the stroking and outlining version of the Edge List Data Base of the present invention.

Referring now to FIG. 13, the concept of stroking can be visualized as defining a pen tip that will trace the normal character outline generated by the OUTLINE MODULE 140. The pen tip represented by FIG. 13 can be stored as a data structure representing the shape of the pen tip. The data represented in Table 6 stores the maximum and minimums for each column of the pen tip.

TABLE 6

| Column: | 0 | 1 | 2 | 3 |
|---|---|---|---|---|
| Maximum: | 0 | 1 | 1 | 0 |
| Minimum: | −1 | −2 | −2 | −1 |

Table 7 describes the data necessary to store the width and movement required to get from the "center" of the pen tip to the left or right edges. The center of the pen tip is the point of the pen tip that is placed at the specified (x,y) coordinate, and is not necessarily the actual center of the pen. In the example shown in FIG. 13, the data for the table would be as follows:

TABLE 7

| Width: | 4 |
|---|---|
| Left Edge: | −2 |
| Right Edge: | 1 |

Figure 14:
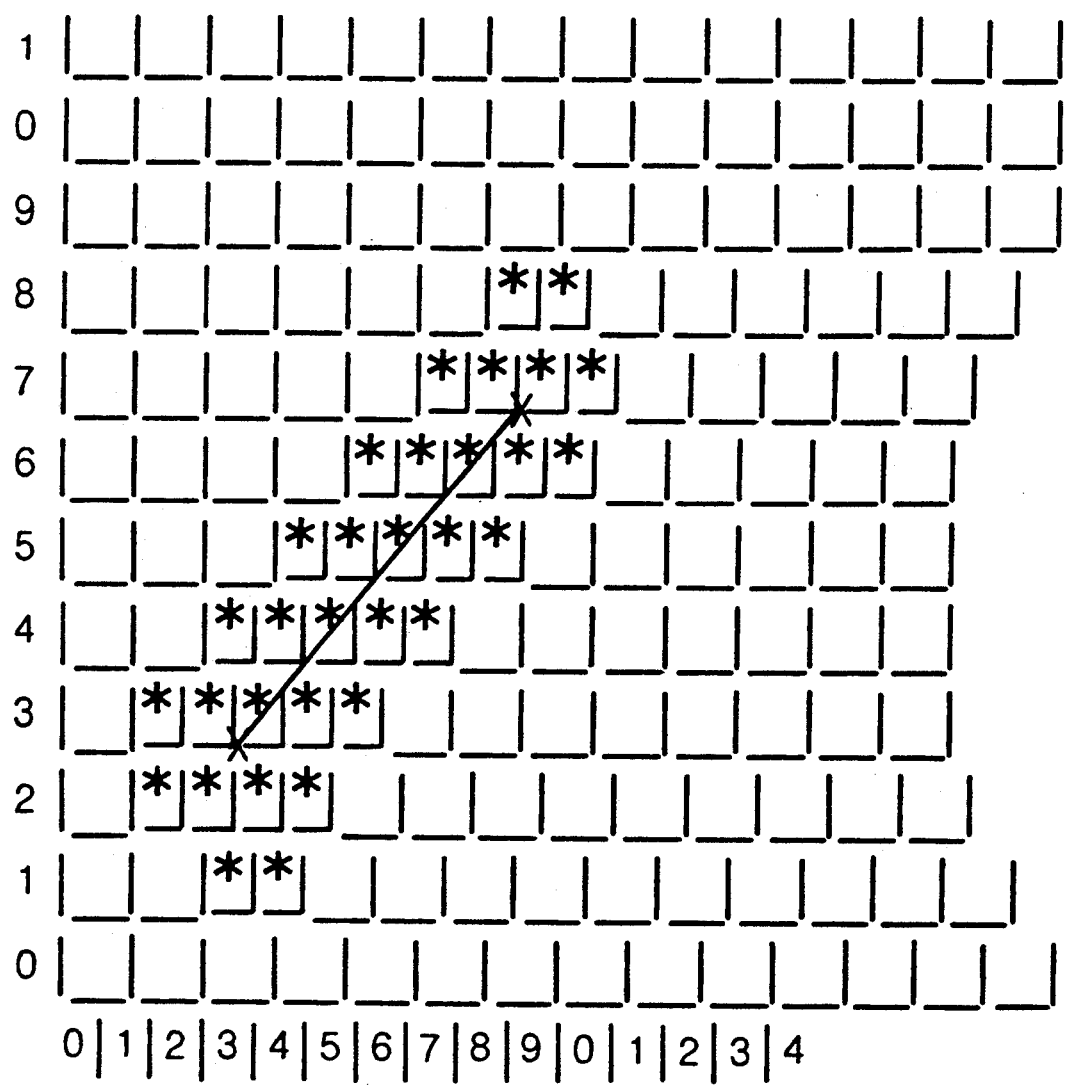
FIG. 14 is a schematic diagram showing the pixel pattern created by using the pen tip shown in FIG. 13 to stroke a line.

When the stroking line is drawn for the character, the pen tip will pass through a number of pixel points. All of the pixel points that are passed through must be turned on; however, only the boundaries of these pixel points must be stored in the EDGE LIST DATA BASE 250. The boundary of the stroked region is computed by keeping the maximum and minimum row reached by the pen tip for each column it passes through. Two edges are thus created, one representing the maximum points and the other representing the minimum points. If these two edges are used as the outline of the stroke, this outline can be filled to produce the proper character stroke. FIG. 14 shows how the pen tip represented by FIG. 13 and the data stored in TABLES 6 and 7 would create a stroke outline for a line from (3,3) to (7,7). The table that would be generated containing the maximums and minimum row values that the pen tip passed through as each column was crossed are represented in TABLE 8 as follows:

TABLE 8

| Column: | 0 | 1 | 2 | 3 | 4 | 5 | 6 | 7 | 8 |
|---|---|---|---|---|---|---|---|---|---|
| Maximum: | — | 3 | 4 | 5 | 6 | 7 | 8 | 8 | 7 |
| Minimum: | — | 2 | 1 | 1 | 2 | 3 | 4 | 5 | 6 |

The edge that represents the upper boundary of the stroke is determined by the maximum entries in TABLE 8 and the edge that represents the lower boundary of the stroke is determined by the minimum entries in TABLE 8. To properly stroke the character, both edges are stored as an Edge List 310 for a separate Edge Header 300. When filling, the winding rule is used and the top edge is assigned a positive winding and the bottom edge is assigned a negative winding. To perform the rasterization or character fill for a stroked character stored in accordance with the present invention, it is not necessary to also store the original outline of the character in the EDGE LIST DATA BASE 250. This is because the stroke edges are plotted on top of the original outline.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

I claim:

1. A real-time rasterization system for controlling the formatting and manipulations of font and character information of images of selected characters to be output to a column-oriented printing apparatus having a predefined worst-case data transfer rate, comprising:

a programmable data processing means for receiving input data representing the character information of the selected characters and font data representing the outlines of the font information of the images of a plurality of selected character sets and for generating column-oriented print data for outputting the selected characters to the printing apparatus, the programable data processing means having:

means for generating a series of edge points defining an outline for each of the selected characters represented by the input data using the font data for one of the selected character sets, each edge point defining a coordinate having values representing a column and a height in the column for the edge point;

means for storing the edge points for each of the selected characters in an intermediate edge list data base as a series of edge segments, each edge segment stored as one or more edge lists, each edge list having only one column crossing per column such that the outline represented by the edge segment does not loop back on itself;

means for retrieving the edge points from the intermediate edge list data base as a series of column crossing points representing all edge points having the same value for the coordinate representing the column; and means for rasterizing the series of column crossing points to produce a column of bit map data representing the print data to be output to the column-oriented printing apparatus, whereby the creation of the intermediate edge list data base allows the data processing means to perform the rasterization of the selected characters in real-time such that the print data is made available to the column-oriented printing apparatus at a rate sufficiently fast enough to keep up with the worst-case data transfer rate of the column-oriented printing apparatus.

2. The real-time rasterization system of claim 1 wherein the means for generating the series of edge points operates asynchronously from the means for retrieving the edge points.

3. The real-time rasterization system of claim 1 wherein the means for rasterizing the column crossing points produces the column of bit map data by applying a fill rule between successive column crossing points in the column.

4. The real-time rasterization system of claim 1 wherein the edge list comprises:

a header record having:

a start coordinate defining the right most edge point;

a direction defining whether the edge segment is a forward edge or a reverse edge;

a winding defining the direction sense used for a winding rule calculation;

an edge data pointer pointing to the next edge point to be used in the edge list; and a next edge pointer pointing to the next edge list in the intermediate edge list data base; and a plurality of data points representing a contiguous string of edge points whose column numbers increase monotonically.

5. The real-time rasterization system of claim 4 wherein the data points are one byte values representing a one column horizontal movement up or down, a one column diagonal movement up or down, or a vertical movement of any number of pixel points along the current column.

6. The real-time rasterization system of claim 1 wherein the means for retrieving the edge points use a master edge list identifying all of the edge segments for a selected character and an active edge list identifying all of the edge segments for a selected character that contain edge points in the column currently being retrieved.

7. The real-time rasterization system of claim 1 further comprising:
buffer means for receiving the print data and storing the print data in a first-in, first-out sequence; and
second programmable data processing means for retrieving the print data from the buffer in response to a control signal from the printing apparatus and outputting the print data to the printing apparatus,
whereby the print data is retrieved from the buffer means by the second programmable data processing means asynchronously with the storing of the print data produced by the means for rasterizing the column crossing points.

8. In combination with a column-oriented printing apparatus and a programmable data processing means for receiving input data representing the character information of the selected characters and font data representing the outlines of the font information of the images of a plurality of selected character sets and for generating print data for outputting the selected characters to the column-oriented printing apparatus, a rasterization system for controlling the formatting and manipulations of the font and character information of the selected characters to be output to the column-oriented printing apparatus, comprising:
means for generating a series of edge points defining an outline for each of the selected characters represented by the input data using the font data for one of the selected character sets, each edge point defining a coordinate having values representing a column and a height in the column for the edge point;
means for storing the edge points and a fill rule for each of the selected characters in an intermediate edge list data base as a series of edge segments, each edge segment stored as one or more edge lists, each edge list having only one column crossing per column such that the outline represented by the edge segment does not loop back on itself;
means for retrieving the edge points from the intermediate edge list data base as a series of column crossing points representing all edge points having the same value for the coordinate representing the column; and
means for rasterizing the column crossing points using the fill rule to produce a column of bit map data representing the column-oriented print data to be output to the printing apparatus.

9. The combination of claim 8 wherein the means for generating the series of edge points operates asynchronously from the means for retrieving the edge points.

10. The combination of claim 8 wherein the edge list comprises:
a header record having:
a start coordinate defining the right most edge point;
a direction defining whether the edge segment is a forward edge or a reverse edge;
a winding defining the direction sense used for a winding rule calculation;
an edge data pointer pointing to the next edge point to be used in the edge list; and
a next edge pointer pointing to the next edge list in the intermediate edge list data base; and a plurality of data points representing a contiguous string of edge points whose column numbers increase monotonically.

11. The combination of claim 10 wherein the data points are one byte values representing a one column horizontal movement up or down, a one column diagonal movement up or down, or a vertical movement of any number of pixel points along the current column.

12. The combination of claim 8 wherein the means for retrieving the edge points use a master edge list identifying all of the edge segments for a selected character and an active edge list identifying all of the edge segments for a selected character that contain edge points in the column currently being retrieved.

13. The combination of claim 8 further comprising:
buffer means for receiving the print data and storing the print data in a first-in, first-out sequence; and
means for retrieving the print data from the buffer in response to a control signal from the printing apparatus and outputting the print data to the printing apparatus,
whereby the print data is retrieved from the buffer means asynchronously with the storing of the print data produced by the means for rasterizing the column crossing points.

14. A rasterization system for controlling the formatting and manipulations of font and character information of images of selected characters to be output to a column-oriented printing apparatus, comprising:
a programmable data processing means for receiving input data representing the character information of the selected characters and font data representing the outlines of the font information of the images of a plurality of selected character sets and for generating print data for outputting the selected characters to the column-oriented printing apparatus, the programable data processing means having:
means for generating a series of first edge points defining an outline for each of the selected characters represented by the input data using the font data for one of the selected character sets, each edge point defining a coordinate having values representing a column and a height in the column for the edge point;
means for generating a pair of second edge points defining a stroking outline for each of the first edge points;
means for storing the second edge points for each of the selected characters in an intermediate edge list data base as a series of edge segments, each edge segment stored as one or more edge lists, each edge list having only one column crossing per column such that the outline represented by the edge segment does not loop back on itself;
means for retrieving the second edge points from the intermediate edge list data base as a series of column crossing points representing all edge points having the same value for the coordinate representing the column; and
means for rasterizing the column crossing points to produce a column of bit map data representing the column-oriented print data to be output to the printing apparatus.

15. The rasterization system of claim 14 wherein the means for generating the pair of second edge points operates asynchronously from the means for retrieving the second edge points.

16. The rasterization system of claim 14 wherein the means for rasterizing the column crossing points produces the column of bit map data by applying a fill rule between successive column crossing points in the column.

17. The rasterization system of claim 14 wherein the edge list comprises:
a header record having:
a start coordinate defining the right most edge point;
a direction defining whether the edge segment is a forward edge or a reverse edge;
a winding defining the direction sense used for a winding rule calculation;
an edge data pointer pointing to the next edge point to be used in the edge list; and
a next edge pointer pointing to the next edge list in the intermediate edge list data base; and
a plurality of data points representing a contiguous string of edge points whose column numbers increase monotonically.

18. The rasterization system of claim 17 wherein the data points are one byte values representing a one column horizontal movement up or down, a one column diagonal movement up or down, or a vertical movement of any number of pixel points along the current column.

19. The real-time rasterization system of claim 14 wherein the means for retrieving the second edge points use a master edge list identifying all of the edge segments for a selected character and an active edge list identifying all of the edge segments for a selected character that contain edge points in the column currently being retrieved.

20. A rasterization system for controlling the formatting and manipulations of font and character information of images of selected characters to be output to a column-oriented printing apparatus, comprising:
input means for receiving all of the font and character information;
format means operably connected to the input means for formatting the relative positions of the selected characters to be output to the printing apparatus using the font and character information;
outline means operably connected to the format means for generating edge points for each pixel coordinate of an outline of the selected character using the font information, each edge point defining a coordinate having values representing a column and a height in the column for the edge point;
edge list means operably connected to the outline means for storing the edge points in an edge list data base as a series of edge segments, each edge segment stored as one or more edge lists, each edge list having only one column crossing per column such that the outline represented by the edge segment does not loop back on itself, and for retrieving the edge points from the edge list data base as a series of column crossing points representing all edge points having the same value for the coordinate representing the column; and
rasterization means operably connected to the edge list means for receiving the column crossing point and producing a column bit map data representing column-oriented print data to be output to the printing apparatus.

21. The rasterization system of claim 20 wherein the input means includes metric means for handling the font information.

22. The rasterization system of claim 20 wherein the format means comprises:
setup formatting means for generating a character origin and a font index for the first character of the selected characters and for the first character of the selected characters each time a new font is designated in the character information; and
run time formatting means for generating information about the character size and character format.

23. The rasterization system of claim 20 further comprising transform means operably connected to the outline means for performing the coordinate transformations of the font information for the selected character to generate the appropriate size outline of the selected character.

24. The rasterization system of claim 23 wherein the transform means utilizes a transformation matrix to perform the coordinate transformations.

25. The rasterization system of claim 24 wherein the transformation matrix is constructed by multiplying together in the specified order; a scaling matrix, an italicizing matrix, a rotation matrix, and a translation matrix.

26. The rasterization system of claim 20 wherein the edge list comprises;
a header record having:
a start coordinate defining the right most edge point;
a direction defining whether the edge segment is a forward edge or a reverse edge;
a winding defining the direction sense used for a winding rule calculation;
an edge data pointer pointing to the next edge point to be used in the edge list; and
a next edge pointer pointing to the next edge list in the edge list data base; and
a plurality of data points representing a contiguous string of edge points whose column numbers increase monotonically.

27. The rasterization system of claim 26 wherein the data points are one byte values representing a one column horizontal movement up or down, a one column diagonal movement up or down, or a vertical movement of any number of pixel points along the current column.

28. The rasterization system of claim 20 wherein the edge list means stores the edge points in the edge list data base asynchronously from retrieving the edge points.

29. The rasterization system of claim 28 wherein the edge list means retrieves the edge point from the edge list data base in response to a signal from the rasterization means.

30. The rasterization system of claim 20 wherein the rasterization means produces the column of bit map data by applying a fill rule between successive column crossing points in the column.

31. The rasterization system of claim 20 further comprising bit map means operably connected to the rasterization means transferring the font information for certain of the selected characters for which a bit map is contained in the font information to the rasterization means to be output to the printing apparatus.

32. The rasterization system of claim 20 further comprising:

buffer means operably connected to the rasterization means for receiving the print data and storing the print data in a first-in, first-out sequence; and output means operably connected to the buffer means for retrieving the print data from the buffer means in response to a control signal from the printing apparatus and outputting the print data to the printing apparatus.

33. The rasterization system of claim 32 wherein the buffer means requests additional print data from the rasterization means when the output level of the buffer means falls below a preset level.

34. A rasterization system for controlling the formatting and manipulations of font and character information of images of selected characters to be output to a column-oriented printing apparatus, comprising:

input means for receiving all of the font and character information;

format means operably connected to the input means for formatting the relative positions of the selected characters to be output to the printing apparatus using the font and character information, comprising:

setup formatting means for generating a character origin and a font index for the first character of the selected characters and for the first character of the selected characters each time a new font is designated in the character information; and run time the formatting means for generating information about the character size and character format;

outline means operably connected to the format means for generating edge points for each pixel coordinate of an outline of the selected character using the font information, each edge point defining a coordinate having values representing a column and a height in the column for the edge point;

transform means operably connected to the outline means for performing the coordinate transformations of the font information for the selected character to generate the appropriate size outline of the selected character utilizing a transformation matrix to perform the coordinate transformations wherein the transformation matrix is constructed by multiplying together in the specified order; a scaling matrix, an italicizing matrix, a rotation matrix, and a translation matrix;

edge list means operably connected to the outline means for storing the edge points in an edge list data base as a series of edge segments and for retrieving the edge points from the edge list data base as a series of column crossing points representing all edge points having the same value for the coordinate representing the column asynchronously from storing the edge points, the edge segments being stored in the edge list data base as a plurality of edge lists, each edge list having only one column crossing per column such that the outline represented by the edge segment does not loop back on itself, the edge list comprising:

a header record having:

a start coordinate defining the right most edge point;

a direction defining whether the edge segment is a forward edge or a reverse edge;

a winding defining the direction sense used for a winding rule calculation;

an edge data pointer pointing to the next edge point to be used in the edge list; and a next edge pointer pointing to the next edge list in the edge list data base; and a plurality of data points representing a contiguous string of edge points whose column numbers increase monotonically, the data points being one byte values representing a one column horizontal movement up or down, a one column diagonal movement up or down, or a vertical movement of any number of pixel points along the current column;

rasterization means operably connected to the edge list means for receiving the column crossing point and producing a column bit map data representing column-oriented print data to be output to the printing apparatus;

bit map means operably connected to the rasterization means transferring the font information for certain of the selected characters for which a bit map is contained in the font information to the rasterization means to be output to the printing apparatus;

buffer means operably connected to the rasterization means for requesting and receiving print data from the rasterization means when the output level of the buffer means falls below a preset level and storing the print data in a first-in, first-out sequence; and output means operably connected to the buffer means for retrieving the print data from the buffer means in response to a control signal from the printing apparatus and outputting the print data to the printing apparatus.

35. A method for performing a real-time rasterization of character and font information for a column-oriented printing apparatus using a programmable data processing means, the character and font information being represented as outlines of a plurality of selected characters for a given segment of columns to be output to the printing apparatus, the outlines being stored as a sequence of edge points, each edge point defining a coordinate having values representing a column and a height in the column for the edge point, comprising the steps of:

differentially encoding the edge points to produce a plurality of edge segments to represent each selected character, each edge segment representing a curve, a line or a move and being defined by a coordinate representing an end of the edge segment in terms of values relative to a previous edge segment such that the edge segment will represent only one column crossing per column, each edge segment stored as one or more edge lists, each edge list having only one column crossing per column such that the outline represented by the edge segment does not loop back on itself;

storing the edge segments for the selected characters in an edge list data base on a character by character basis; and for each column to be output to the printing apparatus, searching the edge list data base for all edge segments that cross the column to produce a set of column crossing points for the column;

rasterizing the portions of the selected characters represented by the column crossing points for the column in accordance with a predetermined fill rule; and outputting the column of the rasterized portions of the selected characters to the printing apparatus.

36. A method for controlling the formatting and manipulations of font and character information of images of selected characters by a programmable data processing means to be output to a column-oriented printing apparatus, comprising the steps of:

receiving input data representing the character information of the selected characters and font data representing the outlines of the font information of the images of a plurality of selected character sets;

generating a series of edge points defining an outline for each of the selected characters represented by the input data using the font data using the font data for one of the selected character sets, each edge point defining a coordinate having values representing a column and a height in the column for the edge point;

storing the edge points for each of the selected characters in an intermediate edge list data as a series of edge segments, each edge segment stored as one or more edge lists, each edge list having only one column crossing per column such that the outline represented by the edge segment does not loop back on itself;

retrieving the edge points from the intermediate edge list data base as a series of column crossing points representing all edge points having the same value for the coordinate representing the column; and rasterizing the column crossing points to produce a column of bit map data representing the column-oriented print data to be output to the printing apparatus.

37. The method of claim 36 wherein the step of generating the series of edge points is performed asynchronously from the step of retrieving the edge points.

38. The method of claim 36 wherein the step of rasterizing the column crossing points produces the column of bit map data by applying a fill rule between successive column crossing points in the column.

39. The method of claim 36 wherein the step of storing the edge points in the intermediate edge list data base stores the edge segments as a plurality of edge lists, each edge list having only one column crossing per column such that the outline represented by the edge segment does not loop back on itself.

40. The method of claim 39 wherein the edge list comprises:

a header record having:
a start coordinate defining the right most edge point;
a direction defining whether the edge segment is a forward edge or a reverse edge;
a winding defining the direction sense used for a winding rule calculation;
an edge data pointer pointing to the next edge point to be used in the edge list; and
a next edge pointer pointing to the next edge list in the intermediate edge list data base; and a plurality of data points representing a contiguous string of edge points whose column numbers increase monotonically.

41. The method of claim 40 wherein the data points are one byte values representing a one column horizontal movement up or down, a one column diagonal movement up or down, or a vertical movement of any number of pixel points along the current column.

42. The method of claim 36 wherein the step of retrieving the edge points uses a master edge list to identify all of the edge segments for a selected character and an active edge list to identify all of the edge segments for a selected character that contain edge points in the column currently being retrieved.

43. The method of claim 36 further comprising the steps of:

receiving the print data and storing the print data in a buffer means in a first-in, first-out sequence; and retrieving the print data from the buffer in response to a control signal from the printing apparatus and outputting the print data to the printing apparatus, whereby the print data is retrieved from the buffer means asynchronously with rasterizing the column crossing points.

44. A method for controlling the formatting and manipulations of font and character information of images of selected characters by a programmable data processing means to be output to a column-oriented printing apparatus, comprising the steps of:

receiving input data representing the character information of the selected characters and font data representing the outlines of the font information of the image of a plurality of selected character sets;

generating a series of first edge points defining an outline for each of the selected characters represented by the input data using the font data for one of the selected character sets, each edge point defining a coordinate having values representing a column and a height in the column for the edge point;

generating a pair of second edge points defining a stroking outline for each of the first edge points;

storing the second edge points for each of the selected characters in an intermediate edge list data base as a series of edge segments, each segment stored as one or more edge list, each edge list having only one column crossing per column such that the outline represented by the edge segment does not loop back on itself;

retrieving the second edge points from the intermediate edge list data base as a series of column crossing points representing all edge points having the same value for the coordinate representing the column; and rasterzing the column crossing points to produce a column of bit map data representing the column-oriented print data to be output to the printing apparatus.

45. A method for controlling the formatting and manipulations of font and character information of images of selected by a characters by a programmable data processing means to be output to a column-oriented printing apparatus, comprising the steps of:

receiving the font and character information;

formatting the relative positions of the selected characters to be output to the printing apparatus using the font and character information;

generating edge points for each pixel coordinate of an outline of the selected character using the font information, each edge point defining a coordinate having values representing a column and a height in the column for the edge point;

storing the edge points in an edge list data base as a series of edge segment, each edge segment stored as one or more edge lists, each edge list having only one column crossing per column such that the outline represented by the edge segment does not loop back on itself;

retrieving the edge points from the edge list data base as a series of column crossing points representing all edge points having the same value for the coordinate representing the column; and producing a column bit map data representing column-oriented print data to be output to the printing apparatus.

46. The method of claim 45 wherein the step of formatting the relative positions of the selected characters comprises the step of:

generating a character origin and a font index for the first character of the selected characters and for the first character of the selected characters each time a new font is designated in the character information; and generating run time formatting information about the character size and character format.

47. The method of claim 45 further comprising the step of performing the coordinate transformations of the font information for the selected character to generate the appropriate size outline of the selected character.

48. The method of claim 47 wherein the coordinate transformations are performed utilizing a transformation matrix.

49. The method of claim 48 wherein the transformation matrix is constructed by multiply a scaling matrix by an italicizing matrix by a rotation matrix by translation matrix.

50. The method of claim 45 wherein the edge list comprises:

a header record having:

a start coordinate defining the right most edge point;

a direction defining whether the edge segment is a forward edge or a reverse edge;

a winding defining the direction sense used for a winding rule calculation;

an edge data pointer pointing to the next edge point to be used in the edge list; and a next edge pointer pointing to the next edge list in the edge list data base; and a plurality of data points representing a contiguous string of edge points whose column numbers increase monotonically.

51. The method of claim 50 wherein the data points are one byte values representing a one column horizontal movement up or down, a one column diagonal movement up or down, or a vertical movement of any number of pixel points along the current column.

52. The method of claim 45 wherein the step of storing the edge points in the edge list data base operates asynchronously from the step of retrieving the edge points.

53. The method of claim 52 wherein the step of retrieving the edge point from the edge list data base is performed in response to a signal generated by the step of rasterizing column crossing points.

54. The method of claim 45 wherein the step of rasterizing column crossing points produces the column of bit map data by applying a fill rule between successive column crossing points in the column.

55. The method of claim 45 further comprising the step of transferring the font information for certain of the selected characters for which a bit map is contained in the font information to the rasterization means to be output to the printing apparatus.

56. The method of claim 45 further comprising the steps of:

receiving the print data and storing the print data in a first-in, first-out sequence in a buffer means; and retrieving the print data from the buffer means in response to a control signal from the printing apparatus; and outputting the print data to the printing apparatus.

* * * * *